US011163947B2

(12) United States Patent
Mezaoui et al.

(10) Patent No.: US 11,163,947 B2
(45) Date of Patent: Nov. 2, 2021

(54) METHODS AND SYSTEMS FOR MULTI-LABEL CLASSIFICATION OF TEXT DATA

(71) Applicant: IMRSV Data Labs Inc., Ottawa (CA)

(72) Inventors: Hichem Mezaoui, Ottawa (CA);
Aleksandr Gontcharov, Ottawa (CA);
Isuru Gunasekara, Ottawa (CA);
Alexander Luc Pilon, Ottawa (CA);
Qianhui Wan, Ottawa (CA)

(73) Assignee: IMRSV DATA LABS INC., Ottawa (CA)

( * ) Notice: Subject to any disclaimer, the term of this patent is extended or adjusted under 35 U.S.C. 154(b) by 0 days.

(21) Appl. No.: 16/911,727

(22) Filed: Jun. 25, 2020

(65) Prior Publication Data

US 2021/0034812 A1    Feb. 4, 2021

Related U.S. Application Data

(60) Provisional application No. 62/880,213, filed on Jul. 30, 2019.

(51) Int. Cl.
*G06F 40/20* (2020.01)
*G06N 20/20* (2019.01)
(Continued)

(52) U.S. Cl.
CPC .............. *G06F 40/20* (2020.01); *G06N 3/04* (2013.01); *G06N 5/003* (2013.01); *G06N 20/20* (2019.01)

(58) Field of Classification Search
CPC .......... G06F 40/20; G06N 20/20; G06N 3/04; G06N 5/003
(Continued)

(56) References Cited

U.S. PATENT DOCUMENTS 6,684,202 B1 * 1/2004 Humphrey ............ G06F 40/279
706/45
7,467,079 B2 * 12/2008 Morimoto ............. G06F 40/279
704/9
(Continued)

OTHER PUBLICATIONS

Error Rate Analysis of Labeling by Crowdsourcing—Hongwei Li, Bin Yu and Dengyong Zhou—International Conference on Machine Learning 2013 Work-shop: Machine Learning Meets Crowdsourcing. Atalanta, Georgia, USA. 2013.
(Continued)

*Primary Examiner* — Khai N. Nguyen
(74) *Attorney, Agent, or Firm* — Nyssa Inc.

(57) ABSTRACT

There are provided methods and systems for multi-label classification of a sentence. An example method includes obtaining the sentence and generating a first digital representation corresponding to the words of the sentence. The method also includes performing a first classification of the sentence using a classification engine receiving as input the first digital representation. The first classification generates a first set of probabilities each associated with one of the possible labels for the sentence. The classification engine may include a neural network. The method further includes generating an output probability for each given label of the possible labels, which output probability is generated based on a first probability associated with the given label. The first probability is from the first set of probabilities. Moreover, the method includes outputting the output probability for each of the possible labels.

45 Claims, 10 Drawing Sheets

(51) Int. Cl.
  *G06N 5/00* (2006.01)
  *G06N 3/04* (2006.01)
(58) Field of Classification Search
  USPC .......................................................... 704/9
  See application file for complete search history.

(56) References Cited

U.S. PATENT DOCUMENTS

| | | | | |
|---|---|---|---|---|
| 7,526,424 | B2* | 4/2009 | Corston-Oliver | G06F 40/56 704/9 |
| 8,255,786 | B1* | 8/2012 | Gattani | G06F 16/9558 715/205 |
| 8,315,849 | B1* | 11/2012 | Gattani | G06F 40/295 704/2 |
| 8,515,736 | B1* | 8/2013 | Duta | H04M 3/5232 704/9 |
| 8,954,440 | B1* | 2/2015 | Gattani | G06F 16/93 707/738 |
| 9,519,643 | B1* | 12/2016 | Nakagiri | G06F 40/58 |
| 10,110,738 | B1* | 10/2018 | Sawant | H04M 3/436 |
| 10,783,451 | B2* | 9/2020 | Viswanathan | G06N 20/00 |
| 2008/0221878 | A1* | 9/2008 | Collobert | G06F 40/30 704/232 |
| 2012/0131139 | A1* | 5/2012 | Siripurapu | H04L 65/60 709/217 |
| 2013/0185049 | A1* | 7/2013 | Zhao | G06F 40/45 704/2 |
| 2013/0325440 | A1* | 12/2013 | Kim | G06F 16/345 704/9 |
| 2016/0321243 | A1* | 11/2016 | Walia | G06F 16/322 |
| 2019/0122077 | A1* | 4/2019 | Tsishkou | G06K 9/629 |
| 2019/0333500 | A1* | 10/2019 | Kim | G06F 40/30 |
| 2019/0370394 | A1* | 12/2019 | Li | G06N 3/082 |
| 2020/0026759 | A1* | 1/2020 | Schwarm | G06K 9/6267 |
| 2020/0074322 | A1* | 3/2020 | Chungapalli | G06F 40/30 |
| 2020/0125928 | A1* | 4/2020 | Doyle | G06K 9/6256 |
| 2020/0143112 | A1* | 5/2020 | Martinez | G06F 40/30 |
| 2020/0279017 | A1* | 9/2020 | Norton | G06F 16/36 |
| 2020/0344194 | A1* | 10/2020 | Hosseinisianaki | G06N 3/08 |
| 2021/0034812 | A1* | 2/2021 | Mezaoui | G06F 40/20 |
| 2021/0034817 | A1* | 2/2021 | Asao | G06N 3/08 |

OTHER PUBLICATIONS

Efficient Estimation of Word Representations in Vector Space—Tomas Mikolov, Kai Chen, Greg Corrado and Jeffrey Dean—arXiv:1301.3781v3 [cs.CL] Sep. 7, 2013.
Distributed Representations of Words and Phrasesand their Compositionality—Tomas Mikolov, Ilya Sutskever, Kai Chen, Greg Corrado and Jeffrey Dean—arXiv:1310.4546v1 [cs.CL] Oct. 16, 2013.
Combining classifiers for robust PICO element detection—Florian Boudin, Jian-Yun Nie, Joan C Bartlett, Roland Grad, Pierre Pluye and Martin Dawes—BMC Medical Informatics and Decision Making 2010, 10:29.
Sentence retrieval for abstracts of randomized controlled trials—Grace Y Chung—BMC Medical Informatics and Decision Making 2009, 9:10.
Layer Normalization—Jimmy Lei Ba, Jamie Ryan Kiros and Geoffrey E. Hinton—arXiv:1607.06450v1 [stat.ML] Jul. 21, 2016.
Swellshark: A Generative Model for BiomedicalNamed Entity Recognition without Labeled Data—Jason Fries, Sen Wu, Alex Ratner and Christopher Re—arXiv:1704.06360v1 [cs.CL] Apr. 20, 2017.
Semi-supervised sequence tagging with bidirectional language models—Matthew E. Peters, Waleed Ammar, Chandra Bhagavatula and Russell Power—arXiv:1705.00108v1 [cs.CL] Apr. 29, 2017.
Attention Is All You Need—Ashish Vaswan, Noam Shazeer, Niki Parmar, Jakob Uszkorei, Llion Jones, Aidan N. Gomez and Łukasz Kaiser—31st Conference on Neural Information Processing Systems (NIPS 2017), Long Beach, CA, USA.—arXiv:1706.03762v5 [cs.CL] Dec. 6, 2017, Advances in neural information processing systems, pp. 5998-6008.
Universal Language Model Fine-tuning for Text Classification—Jeremy Howard and Sebastian Ruder—arXiv:1801.06146v5 [cs.CL] May 23, 2018.
Deep contextualized word representations—Matthew E. Peters, Mark Neumann, Mohit Iyyer, Matt Gardner, Christopher Clark, Kenton Lee and Luke Zettlemoyer—arXiv:1802.05365v2 [cs.CL] Mar. 22, 2018.
An Efficient Framework for Learning Sentence Representations—Lajanugen Logeswaran and Honglak Lee—arXiv:1803.02893 [cs.CL] Mar. 7, 2018.
BERT: Pre-training of Deep Bidirectional Transformers for Language Understanding—Jacob Devlin, Ming-Wei Chang, Kenton Lee and Kristina Toutanova—arXiv:1810.04805v2 [cs.CL] May 24, 2019.
Enhancing PIO Element Detection in Medical Text Using Contextualized Embedding—Hichem Mezaoui, Aleksandr Gontcharov and Isuru Gunasekara—arXiv:1906.11085v1 [cs.CL] Jun. 26, 2019.
Deep Text Mining of Instagram Data Without Strong Supervision—Kim Hammar, Shatha Jaradat, Nima Dokoohaki and Mihhail Matskin—arXiv:1909.10812v1 [cs.CL] Sep. 24, 2019.
BioBERT: A Pre-Trained Biomedical Language Representation Model for Biomedical Text Mining—Jinhyuk Lee, Wonjin Yoon, Sungdong Kim, Donghyeon Kim, Sunkyu Kim, Chan Ho So and Jaewoo Kang—Bioinformatics, 36(4), 2020, 1234-1240, doi: 10.1093/bioinformatics/btz682, Advance Access Publication Date: Sep. 10, 2019, Original Paper.
Building Fast Decision Trees From Largetraining Sets—A. Franco-Arcega, J.A. Carrasco-Ochoa, G. Sanchez-Diaz and J. Fco Martinez-Trinidad—Intelligent Data Analysis 16 (2012) 649-664, DOI 10.3233/IDA-2012-0542, IOS Press.
Analysis of the Time and Workers Needed to Conduct Systematic Reviews of Medical Interventions Using Data from the PROSPERO Registry—Rohit Borah, Andrew W Brown, Patrice L Capers and Kathryn A Kaiser—BMJ Open: first published as 10.1136/bmjopen-2016-012545 on Feb. 27, 2017.
Evidence-Based Medicine, How to Practice and Teach EBM (Fifth Edition)—Sharon E. Straus, Paul Glasziou, W. Scott Richardson, Brian Haynes, Reena Pattani and Areti Angeliki Veroniki—Elsevier Edinburgh London New York Oxford Philadelphia St. Louis Sydney 2019.
The Unified Medical Language System (UMLS): Integrating Biomedical Terminology—Olivier Bodenreider—Nucleic Acids Research, 2004, vol. 32, Database issueD267-D270, DOI: 10.1093/nar/gkh061.
Batch Normalization: Accelerating Deep Network Training by ReducingInternal Covariate Shift—Sergey Ioffe and Christian Szegedy—Proceedings of the32nd International Conference on Machine Learning, Lille, France, 2015. JMLR: W&CP vol. 37.
Distributed Representations of Sentences and Documents—Quoc Le and Tomas Mikolov—Proceedings of the 31st International Conference on Machine Learning, Beijing, China, 2014. JMLR: W&CP vol. 32, pp. 1188-1196.
LightGBM: A Highly Efficient Gradient Boosting Decision Tree—Guolin Ke, Qi Meng, Thomas Finley, Taifeng Wang, Wei Chen, Weidong Ma, Qiwei Ye and Tie-Yan Liu—31st Conference on Neural Information Processing Systems (NIPS 2017), Long Beach, CA, USA.
Using Correspondence Analysis to Combine Classifiers—Christopher J. Merz—Machine Learning 36, 33-58 (1999).
Bootstrapping a Neural Conversational Agent with Dialogue Self-Play, Crowdsourcing and On-Line Reinforcement Learning—Pararth Shah, Dilek Hakkani-Tur, Bing Liu and Gokhan Tur—Proceedings of NAACL-HLT 2018, pp. 41-51, New Orleans, Louisiana, Jun. 1-6, 2018.
Effective Mapping of Biomedical Text to the UMLS Metathesaurus: The MetaMap Program—Alan R. Aronson—1067-5027/01/$5.00 © 2001 AMIA, Inc.
Expediting Citation Screening Using PICo-based Title-Only Screening for Identifying Studies in Scoping Searches and Rapid Reviews—John Rathbone, Loai Albarqouni, Mina Bakhit, Elaine Beller, Oyungerel

(56) References Cited

OTHER PUBLICATIONS

Byambasuren, Tammy Hoffmann, Anna Mae Scott and Paul Glasziou—Rathbone et al. Systematic Reviews (2017) 6:233, DOI 10.1186/s13643-017-0629-x.
Snorkel: Rapid Training Data Creation with Weak Supervision—Alexander Ratner, Stephen H. Bach, Henry Ehrenberg, Jason Fries, Sen Wu and Christopher Re—The VLDB Journal (2020) 29:709-730, https://doi.org/10.1007/s00778-019-00552-1.
PICO Element Detection in Medical Text via Long Short-Term MemoryNeural Networks—Di Jin and Peter Szolovits—Proceedings of the BioNLP 2018 workshop, pp. 67-75, Melbourne, Australia, Jul. 19, 2018.
Aligning Books and Movies: Towards Story-like Visual Explanations by Watching Movies and Reading Books—Yukun Zhu, Ryan Kiros, Richard Zemel, Ruslan Salakhutdinov, Raquel Urtasun, Antonio Torralba and Sanja Fidler—Proceedings of the IEEE international conference on computer vision (pp. 19-27), 2015.
Improving Language Understanding with Unsupervised Learning—Radford, A., Narasimhan, K., Salimans, T. and Sutskever, I.—Technical report, OpenAI, 2018.
Evidence based medicine: What it is and what it isn't—David L. Sackett, William MC Rosenberg, JA Muir Gray, R. Brian Haynes and W. Scott Richardson—BMJ 1996; 312 pp. 71-72 doi: https://doi.org/10.1136/bmj.312.7023.71 (Published Jan. 13, 1996).
Data programming: Creating large training sets, quickly—Alexander Ratner, Christopher De Sa, Sen Wu, Daniel Selsam, Christopher Ré—2018, Advances in neural information processing systems, pp. 3567-3575. NIPS.

\* cited by examiner

Non-transitory Computer-readable Storage Medium
800

Instructions to receive a sentence from a machine-readable memory
805

Instructions to generate a first digital representation corresponding to words of the sentence
810

Instructions to generate a second digital representation corresponding to the words of the sentence
815

Instructions to perform a first classification of the sentence using a classification engine receiving as input the first digital representation, the first classification to generate a first set of probabilities each associated with one of the possible labels for the sentence
820

Instructions to perform a second classification of the sentence using the classification engine receiving as input the second digital representation, the second classification to generate a second set of probabilities each associated with one of the possible labels for the sentence
825

Instructions to generate a text feature score based on the sentence, the text feature score corresponding to a text feature of the sentence
830

Instructions to generate an output probability for each given label of the possible labels, the output probability generated based on the text feature score, a first probability associated with the given label, and a second probability associated with the given label, the first probability and the second probability from the first set of probabilities and the second set of probabilities respectively
835

Instructions to output the output probability for each of the possible labels
840

Fig. 8

Non-transitory Computer-readable Storage Medium
900

Instructions to obtain a sentence
905

Instructions to generate a first digital representation corresponding to words of the sentence
910

Instructions to perform a first classification of the sentence using a classification engine receiving as input the first digital representation, the first classification to generate a first set of probabilities each associated with one of possible labels for the sentence, the classification engine comprising a neural network having an input layer, a first hidden layer, a second hidden layer, a third hidden layer, a fourth hidden layer, and an output layer
915

Instructions to generate an output probability for each given label of the possible labels, the output probability generated based on a first probability associated with the given label, the first probability from the first set of probabilities
920

Instructions to output the output probability for each of the possible labels
925

Fig. 9

METHODS AND SYSTEMS FOR MULTI-LABEL CLASSIFICATION OF TEXT DATA

CROSS-REFERENCE TO RELATED APPLICATION

This application claims the benefit of, and priority from, U.S. Provisional Patent Application No. 62/880,213, filed on Jul. 30, 2019, which is incorporated herein by reference in its entirety.

FIELD

The present specification relates to methods and systems for classification of text data, and in particular to methods and systems for multi-label classification of text data.

BACKGROUND

Human activities may be reported as or transcribed into corresponding text records. In order for useful insights to be gained from such text records, the records may be organized. One example of such organization may include classifying the text records.

SUMMARY

According to an implementation of the present specification there is provided a method for multi-label classification of a sentence, the method comprising: receiving the sentence from a machine-readable memory; generating a first digital representation corresponding to words of the sentence; generating a second digital representation corresponding to the words of the sentence; performing a first classification of the sentence using a classification engine receiving as input the first digital representation, the first classification to generate a first set of probabilities each associated with one of possible labels for the sentence; performing a second classification of the sentence using the classification engine receiving as input the second digital representation, the second classification to generate a second set of probabilities each associated with one of the possible labels for the sentence; generating a text feature score based on the sentence, the text feature score corresponding to a text feature of the sentence; generating an output probability for each given label of the possible labels, the output probability generated based on the text feature score, a first probability associated with the given label, and a second probability associated with the given label, the first probability and the second probability from the first set of probabilities and the second set of probabilities respectively; and outputting the output probability for each of the possible labels.

The generating the first digital representation may comprise generating the first digital representation using Bidirectional Encoder Representations from Transformers (BERT).

The generating the second digital representation may comprise generating the second digital representation using Bio-BERT.

The classification engine may comprise a neural network.

The neural network may comprise an input layer, a first hidden layer, a second hidden layer, a third hidden layer, a fourth hidden layer, and an output layer.

The neural network may further comprise a self attention layer between the input layer and the first hidden layer.

At least one of the first hidden layer, the second hidden layer, the third hidden layer, and the fourth hidden layer may comprise a dense linear layer.

The neural network may further comprise a first dropout applied to the first hidden layer.

The first dropout may comprise an about 0.1 dropout.

The neural network may further comprise a second dropout applied to the second hidden layer.

The second dropout may comprise an about 0.1 dropout.

The neural network may comprise a first layer normalization applied to the first hidden layer.

The second hidden layer may comprise more neurons than the first hidden layer.

The second hidden layer may comprise about four times more neurons than the first hidden layer.

The neural network may further comprise a third dropout applied to the third hidden layer.

The third dropout may comprise an about 0.1 dropout.

The neural network may further comprise a second layer normalization applied to the third hidden layer.

The output layer may comprise a number of neurons corresponding to a number of the possible labels for the sentence.

The neural network may further comprise a third layer normalization applied to the fourth hidden layer.

The neural network may further comprise a fourth dropout applied to the fourth hidden layer.

The fourth dropout may comprise an about 0.1 dropout.

The neural network may comprise a loss function comprising binary cross entropy with logits.

The method may further comprise: generating a further text feature score based on the sentence; and wherein: the generating the output probability may comprise generating the output probability based on the text feature score, the further text feature score, the first probability, and the second probability.

The generating the text feature score may comprise calculating a ratio of a number of quantitative features of the sentence to a corrected number of the words of the sentence; and the generating the further text feature score may comprise calculating an average text frequency inverse document frequency (TF-IDF) score for the sentence.

The calculating the average TF-IDF score may comprise: calculating a TF-IDF score for each word of the sentence; summing the TF-IDF scores to obtain an aggregate TF-IDF score; and dividing the aggregate TF-IDF score by a number of the words in the sentence.

The labels may comprise population, intervention, and outcome to be used to characterize the sentence in a medical context.

The generating the output probability may comprise generating the output probability using a decision tree taking as attributes the text feature score, the first probability, and the second probability, the decision tree comprising a light gradient boosting machine (LGBM).

The method may further comprise: training the classification engine using a training dataset before one or more of the performing the first classification and the performing the second classification; wherein: the training may comprise soft labelling a plurality of full-text documents using a generative model to generate the training dataset.

The soft labelling may comprise using at least one labelling function to label at least a given portion of each of the full-text documents, for each of the full-text documents the labelling function to: generate one of a set of possible outputs comprising positive, abstain, and negative in relation to associating the given portion with a given label; and generate the one of the set of possible outputs using a frequency-based approach comprising assessing the given portion in relation to at least another portion of the full-text document.

The soft labelling may comprise generating using the generative model soft labels based on a weighted majority vote of a plurality of labelling functions, the plurality of the labelling functions comprising the at least one labelling function and one or more additional labelling functions.

A density of the labelling functions may be in a middle-density regime.

According to another implementation of the present specification there is provided a method for multi-label classification of a sentence, the method comprising: obtaining the sentence; generating a first digital representation corresponding to words of the sentence; performing a first classification of the sentence using a classification engine receiving as input the first digital representation, the first classification to generate a first set of probabilities each associated with one of possible labels for the sentence, the classification engine comprising a neural network. The neural network may have: an input layer, a first hidden layer, a second hidden layer, a third hidden layer, a fourth hidden layer, and an output layer; a self attention layer between the input layer and the first hidden layer; and at least one of: a first dropout applied to the first hidden layer; a second dropout applied to the second hidden layer; a third dropout applied to the third hidden layer; and a fourth dropout applied to the fourth hidden layer. The method may further comprise generating an output probability for each given label of the possible labels, the output probability generated based on a first probability associated with the given label, the first probability from the first set of probabilities; and outputting the output probability for each of the possible labels.

At least one of the first dropout, the second dropout, the third dropout, and the fourth dropout may comprise an about 0.1 dropout.

At least one of the first hidden layer, the second hidden layer, the third hidden layer, and the fourth hidden layer may comprise a dense linear layer.

The neural network may further comprise a first layer normalization applied to the first hidden layer.

The second hidden layer may comprise more neurons than the first hidden layer.

The second hidden layer may comprise about four times more neurons than the first hidden layer.

The neural network may further comprise a second layer normalization applied to the third hidden layer.

The output layer may comprise a number of neurons corresponding to a number of the possible labels for the sentence.

The neural network may further comprise a third layer normalization applied to the fourth hidden layer.

The neural network may comprise a loss function comprising binary cross entropy with logits.

The generating the first digital representation may comprise generating the first digital representation using one of: Bidirectional Encoder Representations from Transformers (BERT); and Bio-BERT.

The generating the output probability may comprise setting the output probability to be the first probability.

The method may further comprise: generating a text feature score based on the sentence, the text feature score corresponding to a text feature of the sentence; and wherein: the generating the output probability may comprise generating the output probability based on the text feature score and the first probability.

The method may further comprise: generating a further text feature score based on the sentence; and wherein: the generating the output probability may comprise generating the output probability based on the text feature score, the further text feature score, and the first probability.

The generating the text feature score may comprise calculating a ratio of a number of quantitative features of the sentence to a corrected number of the words of the sentence; and the generating the further text feature score may comprise calculating an average text frequency inverse document frequency (TF-IDF) score for the sentence.

The calculating the average TF-IDF score may comprise: calculating a TF-IDF score for each word of the sentence; summing the TF-IDF scores to obtain an aggregate TF-IDF score; and dividing the aggregate TF-IDF score by a number of the words in the sentence.

The method may further comprise: generating a second digital representation corresponding to the words of the sentence; and performing a second classification of the sentence using the classification engine receiving as input the second digital representation, the second classification to generate a second set of probabilities each associated with one of the possible labels for the sentence; and wherein: the generating the output probability may comprise generating the output probability based on the text feature score, the further text feature score, the first probability, and a second probability, the second probability associated with the given label, the second probability from the second set of probabilities.

The generating the first digital representation and the generating the second digital representation may comprise generating the first digital representation using BERT and generating the second digital representation using Bio-BERT.

The generating the output probability may comprise generating the output probability using a decision tree taking as attributes the text feature score, the further text feature score, the first probability, and the second probability, the decision tree comprising a light gradient boosting machine (LGBM).

The labels may comprise population, intervention, and outcome to be used to characterize the sentence in a medical context.

The method may further comprise: training the classification engine using a training dataset before the performing the first classification; wherein: the training may comprise soft labelling a plurality of full-text documents using a generative model to generate the training dataset.

The soft labelling may comprise using at least one labelling function to label at least a given portion of each of the full-text documents, for each of the full-text documents the labelling function to: generate one of a set of possible outputs comprising positive, abstain, and negative in relation to associating the given portion with a given label; and generate the one of the set of possible outputs using a frequency-based approach comprising assessing the given portion in relation to at least another portion of the full-text document.

The soft labelling may comprise generating using the generative model soft labels based on a weighted majority vote of a plurality of labelling functions, the plurality of the labelling functions comprising the at least one labelling function and one or more additional labelling functions.

A density of the labelling functions may be in a middle-density regime.

According to yet another implementation of the present specification there is provided a system for multi-label classification of a sentence, the system comprising: a memory to store the sentence having words; and a processor in communication with the memory. The processor may be to: receive the sentence from the memory; generate a first digital representation corresponding to the words of the sentence; generate a second digital representation corresponding to the words and the of the sentence; perform a first classification of the sentence using a classification engine receiving as input the first digital representation, the first classification to generate a first set of probabilities each associated with one of possible labels for the sentence; perform a second classification of the sentence using the classification engine receiving as input the second digital representation, the second classification to generate a second set of probabilities each associated with one of the possible labels for the sentence; generate a text feature score based on the sentence, the text feature score corresponding to a text feature of the sentence; generate an output probability for each given label of the possible labels, the output probability generated based on the text feature score, a first probability associated with the given label, and a second probability associated with the given label, the first probability and the second probability from the first set of probabilities and the second set of probabilities respectively; and output the output probability for each of the possible labels.

To generate the first digital representation the processor may be to generate the first digital representation using Bidirectional Encoder Representations from Transformers (BERT).

To generate the second digital representation the processor may be to generate the second digital representation using Bio-BERT.

The classification engine may comprise a neural network.

The neural network may comprise an input layer, a first hidden layer, a second hidden layer, a third hidden layer, a fourth hidden layer, and an output layer.

The neural network may further comprise a self attention layer between the input layer and the first hidden layer.

At least one of the first hidden layer, the second hidden layer, the third hidden layer, and the fourth hidden layer may comprise a dense linear layer.

The neural network may further comprise a first dropout applied to the first hidden layer.

The first dropout may comprise an about 0.1 dropout.

The neural network may further comprise a second dropout applied to the second hidden layer.

The second dropout may comprise an about 0.1 dropout.

The neural network may comprise a first layer normalization applied to the first hidden layer.

The second hidden layer may comprise more neurons than the first hidden layer.

The second hidden layer may comprise about four times more neurons than the first hidden layer.

The neural network may further comprise a third dropout applied to the third hidden layer.

The third dropout may comprise an about 0.1 dropout.

The neural network may further comprise a second layer normalization applied to the third hidden layer.

The output layer may comprise a number of neurons corresponding to a number of the possible labels for the sentence.

The neural network may further comprise a third layer normalization applied to the fourth hidden layer.

The neural network may further comprise a fourth dropout applied to the fourth hidden layer.

The fourth dropout may comprise an about 0.1 dropout.

The neural network may comprise a loss function comprising binary cross entropy with logits.

The processor may be further to: generate a further text feature score based on the sentence; and wherein: to generate the output probability the processor may be to generate the output probability based on the text feature score, the further text feature score, the first probability, and the second probability.

To generate the text feature score the processor may be to calculate a ratio of a number of quantitative features of the sentence to a corrected number of the words of the sentence; and to generate the further text feature score the processor may be to calculate an average text frequency inverse document frequency (TF-IDF) score for the sentence.

To calculate the average TF-IDF score the processor may be to: calculate a TF-IDF score for each word of the sentence; sum the TF-IDF scores to obtain an aggregate TF-IDF score; and divide the aggregate TF-IDF score by a number of the words in the sentence.

The labels may comprise population, intervention, and outcome to be used to characterize the sentence in a medical context.

To generate the output probability the processor may be to generate the output probability using a decision tree taking as attributes the text feature score, the first probability, and the second probability, the decision tree comprising a light gradient boosting machine (LGBM).

The processor may be further to: train the classification engine using a training dataset before one or more of performing the first classification and performing the second classification; wherein: to train the classification engine the processor may be to soft label a plurality of full-text documents using a generative model to generate the training dataset.

To soft label the plurality of the full-text documents the processor may be to use at least one labelling function to label at least a given portion of each of the full-text documents, for each of the full-text documents the labelling function to: generate one of a set of possible outputs comprising positive, abstain, and negative in relation to associating the given portion with a given label; and generate the one of the set of possible outputs using a frequency-based approach comprising assessing the given portion in relation to at least another portion of the full-text document.

To soft label the plurality of the full-text documents the processor may be to generate using the generative model soft labels based on a weighted majority vote of a plurality of labelling functions, the plurality of the labelling functions comprising the at least one labelling function and one or more additional labelling functions.

A density of the labelling functions may be in a middle-density regime.

According to yet another implementation of the present specification there is provided a system for multi-label classification of a sentence, the system comprising: a memory to store the sentence having words; and a processor in communication with the memory. The processor may be to: generate a first digital representation corresponding to words of the sentence; perform a first classification of the sentence using a classification engine receiving as input the first digital representation, the first classification to generate a first set of probabilities each associated with one of possible labels for the sentence, the classification engine comprising a neural network. The neural network may have: an input layer, a first hidden layer, a second hidden layer, a third hidden layer, a fourth hidden layer, and an output layer;

a self attention layer between the input layer and the first hidden layer; and at least one of: a first dropout applied to the first hidden layer; a second dropout applied to the second hidden layer; a third dropout applied to the third hidden layer; and a fourth dropout applied to the fourth hidden layer. The processor may also generate an output probability for each given label of the possible labels, the output probability generated based on a first probability associated with the given label, the first probability from the first set of probabilities; and output the output probability for each of the possible labels.

At least one of the first dropout, the second dropout, the third dropout, and the fourth dropout may comprise an about 0.1 dropout.

At least one of the first hidden layer, the second hidden layer, the third hidden layer, and the fourth hidden layer may comprise a dense linear layer.

The neural network may further comprise a first layer normalization applied to the first hidden layer.

The second hidden layer may comprise more neurons than the first hidden layer.

The second hidden layer may comprise about four times more neurons than the first hidden layer.

The neural network may further comprise a second layer normalization applied to the third hidden layer.

The output layer may comprise a number of neurons corresponding to a number of the possible labels for the sentence.

The neural network may further comprise a third layer normalization applied to the fourth hidden layer.

The neural network may comprise a loss function comprising binary cross entropy with logits.

To generate the first digital representation the processor may be to generate the first digital representation using one of: Bidirectional Encoder Representations from Transformers (BERT); and Bio-BERT.

To generate the output probability the processor may be to set the output probability to be the first probability.

The processor may be further to: generate a text feature score based on the sentence, the text feature score corresponding to a text feature of the sentence; and wherein: to generate the output probability the processor may be to generate the output probability based on the text feature score and the first probability.

The processor may be further to: generate a further text feature score based on the sentence; and wherein: to generate the output probability the processor may be to generate the output probability based on the text feature score, the further text feature score, and the first probability.

To generate the text feature score the processor may be to calculate a ratio of a number of quantitative features of the sentence to a corrected number of the words of the sentence; and to generate the further text feature score the processor may be to calculate an average text frequency inverse document frequency (TF-IDF) score for the sentence.

To calculate the average TF-IDF score the processor may be to: calculate a TF-IDF score for each word of the sentence; sum the TF-IDF scores to obtain an aggregate TF-IDF score; and divide the aggregate TF-IDF score by a number of the words in the sentence.

The processor may be further to: generate a second digital representation corresponding to the words of the sentence; and perform a second classification of the sentence using the classification engine receiving as input the second digital representation, the second classification to generate a second set of probabilities each associated with one of the possible labels for the sentence; and wherein: to generate the output probability the processor may be to generate the output probability based on the text feature score, the further text feature score, the first probability, and a second probability, the second probability associated with the given label, the second probability from the second set of probabilities.

To generate the first digital representation and to generate the second digital representation the processor may be to generate the first digital representation using BERT and generate the second digital representation using Bio-BERT.

To generate the output probability the processor may be to generate the output probability using a decision tree taking as attributes the text feature score, the further text feature score, the first probability, and the second probability, the decision tree comprising a light gradient boosting machine (LGBM).

The labels may comprise population, intervention, and outcome to be used to characterize the sentence in a medical context.

The processor may be further to: train the classification engine using a training dataset before performing the first classification; wherein: to train the classification engine the processor may be to soft label a plurality of full-text documents using a generative model to generate the training dataset.

To soft label the plurality of the full-text documents the processor may be to use at least one labelling function to label at least a given portion of each of the full-text documents, for each of the full-text documents the labelling function to: generate one of a set of possible outputs comprising positive, abstain, and negative in relation to associating the given portion with a given label; and generate the one of the set of possible outputs using a frequency-based approach comprising assessing the given portion in relation to at least another portion of the full-text document.

To soft label the plurality of the full-text documents the processor may be to generate using the generative model soft labels based on a weighted majority vote of a plurality of labelling functions, the plurality of the labelling functions comprising the at least one labelling function and one or more additional labelling functions.

A density of the labelling functions may be in a middle-density regime.

According to yet another implementation of the present specification there is provided a system for multi-label classification of a sentence, the system comprising: a vectorization engine comprising: a first memory module comprising a first memory to store the sentence having words; and a first processor module comprising a first processor in communication with the first memory. The first processor module may be to: generate a first digital representation corresponding to the words of the sentence; and generate a second digital representation corresponding to the words of the sentence. The system may also comprise a first classification engine in communication with the vectorization engine, the first classification engine comprising: a second memory module comprising at least one of the first memory and a second memory; and a second processor module comprising at least one of the first processor and a second processor, the second processor module in communication with the second memory module. The second processor module may be to: perform a first classification of the sentence using as input the first digital representation, the first classification to generate a first set of probabilities each associated with one of possible labels for the sentence. The system my further comprise a second classification engine in communication with the vectorization engine, the second classification engine comprising: a third memory module comprising at least one of the second memory module and a third memory; and a third processor module comprising at least one of the second processor module and a third processor, the third processor module in communication with the third memory module. The third processor module may be to: perform a second classification of the sentence using as input the second digital representation, the second classification to generate a second set of probabilities each associated with one of the possible labels for the sentence. Moreover, the system comprises a text feature quantification (TFQ) engine comprising: a fourth memory module comprising at least one of the third memory module and a fourth memory; and a fourth processor module comprising at least one of the third processor module and a fourth processor, the fourth processor module in communication with the fourth memory module. The fourth processor module may be to: generate a text feature score based on the sentence, the text feature score corresponding to a text feature of the sentence. Moreover, the system also comprises a boosting engine in communication with the first classification engine, the second classification engine, and the TFQ engine, the boosting engine comprising: a fifth memory module comprising at least one of the fourth memory module and a fifth memory; and a fifth processor module comprising at least one of the fourth processor module and a fifth processor, the fifth processor module in communication with the fifth memory module. The fifth processor module may be to generate an output probability for each given label of the possible labels, the output probability generated based on the text feature score, a first probability associated with the given label, and a second probability associated with the given label, the first probability and the second probability from the first set of probabilities and the second set of probabilities respectively.

The fifth processor module may be further to output the output probability for each of the possible labels.

The first processor module may be to: generate the first digital representation using BERT; and generate the second digital representation using Bio-BERT.

The at least one of the first classification engine and the second classification engine may comprise a neural network having an input layer, a first hidden layer, a second hidden layer, a third hidden layer, a fourth hidden layer, and an output layer.

The fourth processor module may be further to generate a further text feature score based on the sentence; and to generate the output probability the fifth processor module may be to generate the output probability based on the text feature score, the further text feature score, the first probability, and the second probability.

To generate the text feature score the fourth processor module may be to calculate a ratio of a number of quantitative features of the sentence to a corrected number of the words of the sentence; and to generate the further text feature score the fourth processor module may be to calculate an average text frequency inverse document frequency (TF-IDF) score for the sentence.

According to yet another implementation of the present specification there is provided a non-transitory computer-readable storage medium (CRSM) comprising instructions executable by a processor, the instructions to cause the processor to perform any of the methods described herein.

BRIEF DESCRIPTION OF THE DRAWINGS

In the drawings, identical reference numbers identify similar elements or acts. The sizes and relative positions of elements in the drawings are not necessarily drawn to scale.

For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 8 shows a schematic representation of an example non-transitory computer-readable storage medium comprising instructions executable by a processor, in accordance with a non-limiting implementation of the present specification.

FIG. 9 shows a schematic representation of another example non-transitory computer-readable storage medium comprising instructions executable by a processor, in accordance with a non-limiting implementation of the present specification.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

With increases in the pace of human creative activity, the volume of the resulting text records continues to increase. For example, the increasing volumes of medical publications make it increasingly difficult for medical practitioners to stay abreast of the latest developments in medical sciences. In addition, the increasing ability to capture and transcribe voice and video recordings into text records further increasers the volumes of text data to organize and classify.

Figure 1:
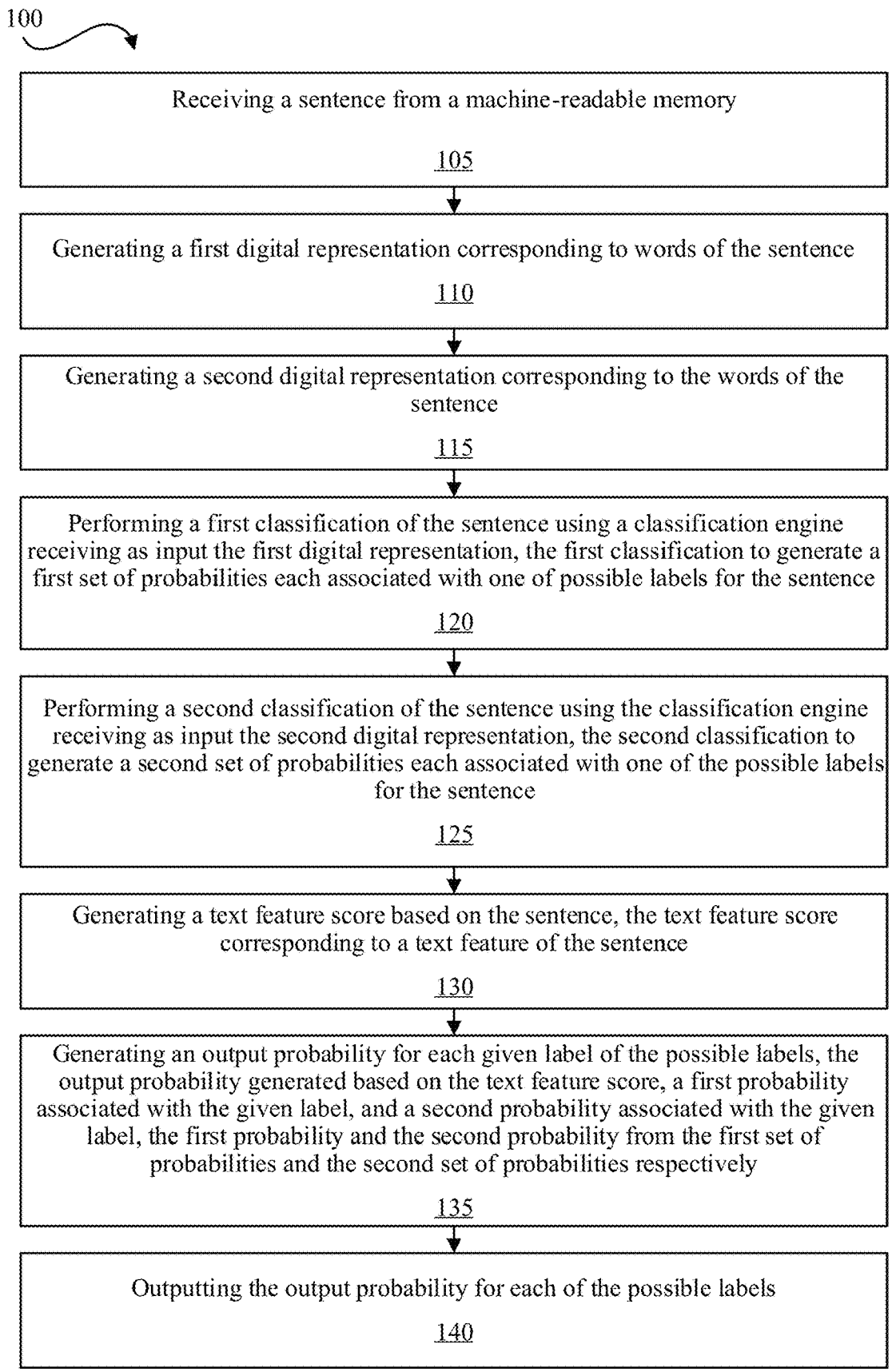
FIG. 1 shows a flowchart of an example method for multi-label classification of a sentence, in accordance with a non-limiting implementation of the present specification.

The methods and systems described herein may allow for multi-label classification of text data such as sentences. "multi-label" refers to a type of classification where an instant that is to be classified, such as a sentence, may be assigned multiple, independent labels from a set of possible labels. Multi-label classification is more technically challenging than single-label classification, where each instance being classified may be assigned only one of the possible labels. FIG. 1 shows a flowchart of an example method 100 for multi-label classification of a sentence. While the methods and systems discussed herein are described in the context of classifying sentences, it is contemplated that these methods and systems may also be used to classify other pieces or sizes of text data such as clauses, phrases, paragraphs, subsections, sections, pages, chapters, and the like.

At box 105 of flowchart 100, a sentence may be received from a machine-readable memory. The machine readable memory may also be referred to as a computer-readable storage medium. Moreover, the machine readable memory may be referred to as "memory", in short form. In some examples, the machine readable memory may comprise a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions. The sentence may be stored in the memory as a data structure. Moreover, in some examples the sentence may be stored in the memory is digital or tokenized form. Moreover, in some examples the sentence may be one of a plurality of sentences stored in the memory.

Receiving the sentence from the memory may comprise receiving the sentence directly or indirectly from the memory. In some examples, receiving the sentence from the memory may comprise retrieving the sentence from the memory. Turning now to box 110, a first digital representation may be generated, which representation may correspond to the words of the sentence. The digital representation may comprise a token, a vector, or an embedding which corresponds to the sentence and may be used as an input into a classification engine, as discussed in greater detail below. Similarly, at box 115 a second digital representation may be generated, which representation may also correspond to the words of the sentence. In this description digital representations may be referred to as "representations", in short form.

In some examples, the first and second representations may be generated using Bidirectional Encoder Representations from Transformers (BERT) and Bio-BERT. Moreover, in some examples the first representation may be generated using BERT and the second representation may be generated using Bio-BERT. Furthermore, in some examples the first representation may be generated using Bio-BERT and the second representation may be generated using BERT.

BERT is based on a deep bidirectional attention text embedding model, as described in (Devlin, Jacob, et al. "Bert: Pre-training of deep bidirectional transformers for language understanding." arXiv preprint arXiv:1810.04805 (2018)), which in incorporated herein by reference in its entirety. In this description "BERT" refers to a version of the Bidirectional Encoder Representations from Transformers that is pre-trained on the BooksCorpus (800M words) and English Wikipedia™ (2,500M words) as described in (Zhu, Y., Kiros, R., Zemel, R., Salakhutdinov, R., Urtasun, R., Toralba, A. and Fidler, S. 2015. Aligning books and movies: Towards story-like visual explanations by watching movies and reading books. In *Proceedings of the IEEE international conference on computer vision* (pp. 19-27)), which is incorporated herein by reference in its entirety. BERT uses the concept of attention and transformer to pre-train deep bidirectional representations from unlabelled text. In a given text, both right and left concept are taken into account and conditioned on. The learned representation could be fine-tuned while training on a specific subsequent task such as question-answering, entailment, next sentence prediction.

Moreover, in this description "Bio-BERT" or "BioBERT" refers to a version of the Bidirectional Encoder Representations from Transformers that is pre-trained on biomedical corpora comprising PubMed™ (4.5B words) and PMC (13.5B words), as described in (Lee, J., Yoon, W., Kim, S., Kim, D., Kim, S., So, C. H. and Kang, J., 2020. BioBERT: a pre-trained biomedical language representation model for biomedical text mining. *Bioinformatics*, 36 (4), pp. 1234-1240), which is incorporated herein by reference in its entirety. PubMed Central (PMC) is a free digital repository that archives publicly accessible full-text scholarly articles that have been published within the biomedical and life sciences journal literature. While BERT and Bio-BERT are used to generate the digital representations described herein, it is contemplated that in some examples different embeddings or vectorizations of sentences may be used. Such other embeddings may include OpenAI GPT (Radford A Narasimhan, K Salimans T. and Sutskever, I., 2018. Improving language understanding with unsupervised learning. *Technical report, OpenAI*), which is incorporated herein by reference in its entirety, Elmo (Peters, M. E., Neumann, M., Iyyer, M., Gardner, M., Clark, C., Lee, K. and Zettlmoyer, L., 2018. Deep contextualized word representations. arXiv preprint arXiv:1802.05365), word2vec (Mikolov, T., Chen, K. Corrado, G. and Dean, J., 2013. Efficient estimation of word representations in vector space. arXiv preprint arXiv: 1301.3781), which is incorporated herein by reference in its entirety, and the like.

Turning now to box 120, a first classification of the sentence may be performed using a classification engine. The classification engine may receive as its input the first representation, and may generate a first set of probabilities each associated with one of the possible labels for the sentence. In some examples the classification engine may comprise a neural network. An example of such a neural network is described in greater detail in relation to FIG. 2. Moreover, in some examples the sentences may be classified in the medical context using the possible labels of "Population" (P), "Intervention" (I), and "Outcome" (O), for example as applied to a text description of the results of a medical treatment or a clinical trial. In other examples, different contexts, labels, and numbers of possible labels may be used for classification.

In the context of multi-label classification, the probabilities for each of the labels among the possible labels may be independent of one another. For example, in the Population-Intervention-Outcome (PIO) context, the classification engine may generate probabilities for the labels P, I, and O, and those probabilities may be independent of one another. For example, the classification engine may assign a sentence a probability of 0.95 for I and also a probability of 0.95 for O, to classify that sentence as relating to both Intervention and Outcome. In some examples, a probability threshold other than 0.95 may be used to assign a label to a given sentence.

At box 125, a second classification of the sentence may be performed using the classification engine. The classification engine may receive as its input the second representation. The second classification may generate a second set of probabilities each associated with one of the possible labels for the sentence. The second classification may be similar to the first classification performed at box 120.

A difference between the first and second classifications may be that in the first classification the classification engine uses the first representation as its input while in the second classification the classification engine uses the second representation as its input. Moreover, in some examples the classification engine may comprise a neural network such as a neural network 200 shown in FIG. 2, as described in greater detail below in relation to FIG. 2. In such examples, the structural attributes of the neural networks used for the first and second classification may be the same or similar. Examples of such structural attributes may include the neural network architecture such as the number of layers, the number of neurons in each layer, and the connectivity of each neuron to other neurons. Structural attributes may also include dropouts and normalizations applied to the layers and neurons of the neural network.

It is also contemplated that the weights and other learnable parameters may be different between the neural network used for the first classification and the weights and other learnable parameters of the structurally-identical neural network used for the second classification. This difference may be caused by the fact that different digital representations of the sentence are used by the classification engine/neural network as its input for the first and second classifications, and the weights and other learnable parameters of the neural networks may evolve differently during the training phase based on the difference between the first and second digital representations. In this description, classification engines or neural networks may be described as or considered to be the same if their structural attributes are the same, even if their weights or other learnable parameters are different from one another.

Furthermore, at box 130 a text feature score may be generated based on the sentence. The text feature score may correspond to a text feature of the sentence. In some examples, the text feature may comprise the quantitative information elements (QIE) of the sentence. In the medical PIO context, examples of quantitative information elements may include percentages, population numbers, dosage of medications, and the like. The text feature score may comprise a QIE score calculated as a ratio of the number of such quantitative features of the sentence to a corrected number of the words of the sentence. In this description the QIE score may also be referred to as "QIEF".

In some examples, the correction applied to obtain the corrected number of words of the sentence may be to remove common words such as articles including "a", "an", and "the", and the like. For example, for the sentence "Ten percent of the patients responded positively to the treatment", the number of the quantitative features would be 2 (ten and percent), the corrected number of the words of the sentence would be 6 (Ten, percent, patients, responded, positively, treatment), and the QIE score calculated as the ratio of 2 to 6 would be about 0.33. Moreover, in some examples other types of corrections may be used. It is also contemplated that in some examples the corrected number of words in the sentence may comprise the number of all the words in the sentence. Moreover, it is contemplated that in other contexts, different text features, including for example different quantitative information elements, may be used to generate the text feature score.

Moreover, in some examples generating the text future score may comprise calculating an average text frequency inverse document frequency (TF-IDF) score for the sentence. Calculating the average TF-IDF score for the sentence may comprise calculating a TF-IDF score for each word of the sentence, summing the TF-IDF scores to obtain an aggregate TF-IDF score, and dividing the aggregate TF-IDF score by the number of words in the sentence. The TF-IDF score for a word may be calculated using the formula $$TF - IDF = -tf \log \frac{1}{N_w},$$

where tf represents the term frequency of the word w in the document and $N_w$ the number of documents containing the word w.

Furthermore, in some examples the number of words in the sentence used in calculating the average TF-IDF score may be a corrected number, as discussed above in relation to the QIE score. In addition, in examples where the piece of text data being classified is different than a sentence (e.g. a phrase, a paragraph, and the like), the QIE and the average TF-IDF scores may be calculated for that piece of text data.

Turning now to box 135, an output probability may be generated for each given label of the possible labels. The output probability may be generated based on the text feature score, a first probability associated with the given label, and a second probability associated with the given label. The first probability and the second probability may be from the first set of probabilities and the second set of probabilities respectively. The output probability for each label may then be used to determine whether that label should be assigned to the sentence.

In some examples, generating the output probability may comprise generating the output probability using a decision tree-based boosting machine taking as attributes the text feature score, the first probability, and the second probability. Furthermore, in some examples the decision tree may comprise or constitute a light gradient boosting machine (LGBM). LGBMs grow trees leaf wise in order to reduce the loss, whereas other machines grow trees level-wise. This means that LGBM chooses the leaf maximum loss to grow. On the same leaf, leaf-wise algorithms can reduce more loss than level-wise algorithms. LGBMs leverage two techniques to enhance the efficiency: Gradient-based-One side Sampling (GOSS) and Exclusive Feature Bundling (EFB). The idea is that with GOSS the only instances with large gradient are taken into account to compute information gain. Whereas, with EFB mutually exclusive features are bundled and therefore reducing the complexity. For example, a library implemented by Microsoft™ and described in (Ke, G., Meng, Q., Finley, T., Wang, T., Chen, W., Ma, W Ye, Q and Liu, T. Y., 2017. Lightgbm: A highly efficient gradient boosting decision tree. In *Advances in neural information processing systems* (pp. 3146-3154)), which is incorporated by reference herein in its entirety, may be used to implement the LGBM. LGBM may adopt a Gradient-based One-Side Sampling (GOSS) and Exclusive Feature Bundling (EFB) techniques. With GOSS all data instances with small gradient are excluded. This minimizes the number of data instances needed to estimate the information gain. The EFB technique may allow for bundling mutually exclusive features, which reduces the complexity of implementation.

It is also contemplated that in some examples decision trees other than LGBMs may be used to generate the output probability. Examples of other such decision trees may include XGBoost, pGBRT, and the like. In some examples, the module which combines the probabilities from the classification engine with the text feature scores to generate the output probabilities may be described as a boosting engine. This module may be implemented in hardware, computer-readable instructions, or a combination of hardware and computer-readable instructions.

Furthermore, it is contemplated that boosting engines need not be a decision tree, and that other types of boosting engines may also be used to generate the output probabilities based on the probabilities from the classification engine and the text feature scores. XGBoost and pGBRT are examples of such other boosting engines. XGBoost and pGBRT may be less efficient than LGBM in terms of scalability and efficiency since, for each feature, XGBoost and pGBRT scan the whole data to estimate the information gain at each split point. In addition, in some examples the boosting engine may generate the output probability by simply calculating a linear combination of the probabilities from the classification engine with the text feature scores.

Turning now to box 140, the output probability may then be output. This outputting may be performed for each of the possible labels for the sentence. In some examples outputting the output probability may comprise storing the output probability in a machine-readable memory, sending the output probability to an output terminal, communicating the output probability to another component or to another system, and the like. Examples of the output terminal may comprise a display, a printer, and the like.

In addition, in some examples more than one text feature score may be generated and used in conjunction with the first and second probabilities from the classification engine to generate the output probabilities. For example, in some examples method 100 may further comprise generating a further text feature score based on the sentence. In such examples generating the output probability may comprise generating the output probability based on the text feature score, the further text feature score, the first probability, and the second probability. Furthermore, in some examples the text feature score may comprise one of the QIE score and the average TF-IDF score and the further text feature score may comprise the other one of the QIE score and the average TF-IDF score.

Figure 2:
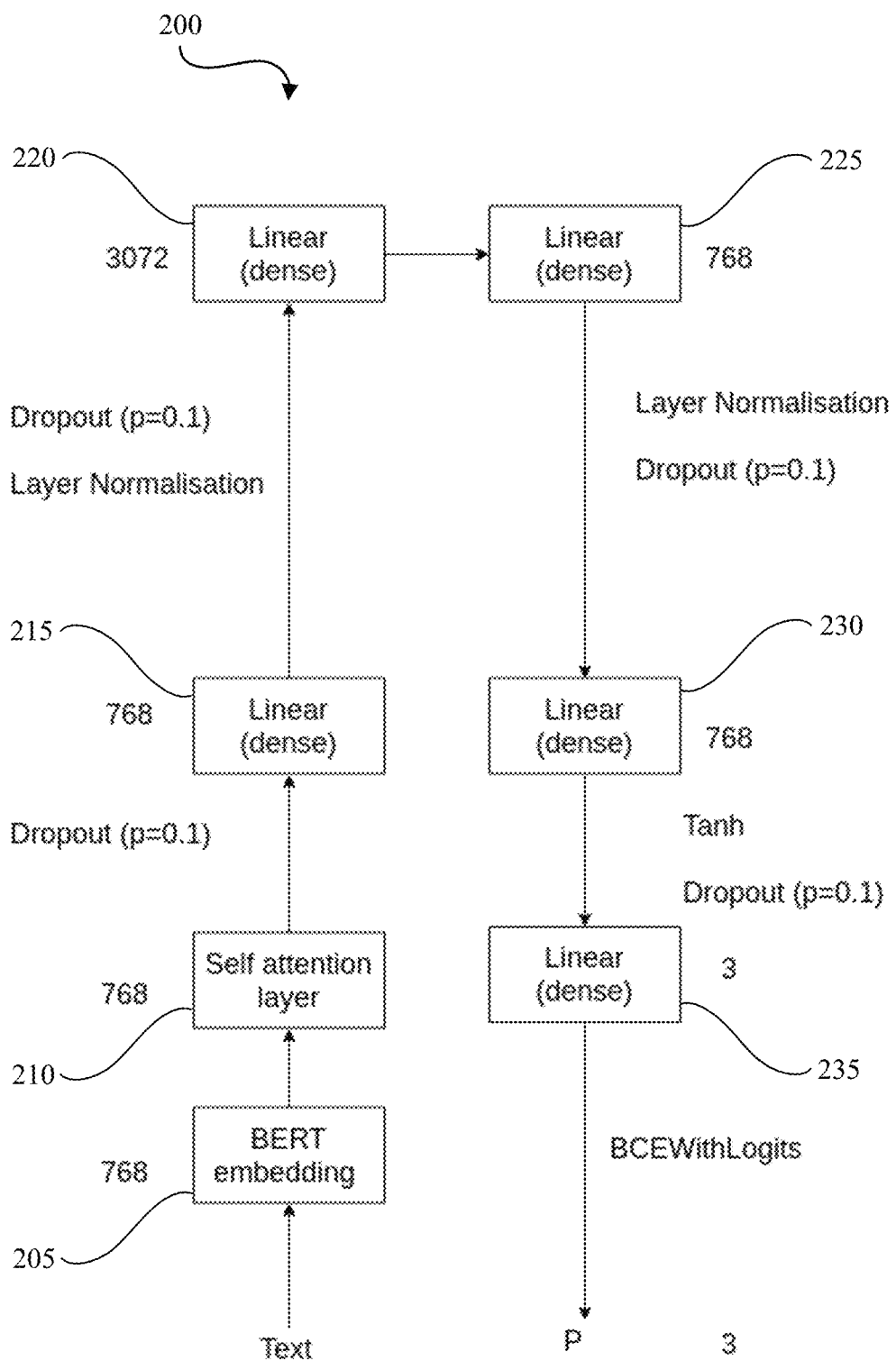
FIG. 2 shows a schematic representation of an example neural network, which may be used as part of a classification engine for multi-label classification of a sentence, in accordance with a non-limiting implementation of the present specification.

Turning now to FIG. 2, a schematic representation is shown of an example neural network 200, which may be used as part of the classification engines discussed in relation to method 100 and the other methods described herein. Neural network 200 comprises an input layer 205, a first hidden layer 215, a second hidden layer 220, a third hidden layer 225, a fourth hidden layer 230, and an output layer 235.

Layers other than the input and output layers are referred to as hidden layers. As such first hidden layer 215, second hidden layer 220, third hidden layer 225, and fourth hidden layer 230 are designated as hidden layers. These hidden layers comprise linear layers. In addition, the hidden layers and output layer 235 may comprise dense layers. Layers may be described as dense when each neuron in that layer is connected to the neurons in the adjacent layers. It is contemplated that in some examples of the neural network, the hidden layers and the output layer need not be dense layers.

Input layer 205 receives the digital representation corresponding to the words of the sentence to be classified. In neural network 200, input layer 205 receives the representation generated by Bidirectional Encoder Representations from Transformers. As discussed above, in some examples this representation may be generated by BERT or Bio-BERT. It is contemplated that in some examples other representations or embeddings of the sentence may also be used. As shown in FIG. 2, input layer 205 may have 768 neurons. This number is dictated by the representation generated by BERT or Bio-BERT. In examples where representations other than those generated by BERT or Bio-BERT are used, input layer 205 may have a number of neurons other than 768.

Neural network 200 also comprises a self attention layer 210, which also has 768 neurons. An attention function may include mapping a query and a set of key-value pairs to an output, where the query, keys, values, and output are all vectors. The output is computed as a weighted sum of the values, where the weight assigned to each value is computed by a compatibility function of the query with the corresponding key.

The self-attention mechanism may permit reducing the total computational complexity per layer (compared to recurrent and convolutional layer types, for example). In addition, the self-attention mechanism may increase the amount of computation that may be parallelized. Furthermore, the self-attention mechanism is generally associated with relatively short path lengths between long range dependencies in the network, which optimizes the learning of long-range dependencies. The basic implementation of an example self attention mechanism is described in (Vaswani, A., Shazeer, N., Parmar, N., Uszkoreit, J., Jones, L., Gomez, A. N., Kaiser, L. and Polosukhin, I., 2017. Attention is all you need. In *Advances in neural information processing systems* (pp. 5998-6008)), which is incorporated herein by reference in its entirety.

The attention mechanism may be implemented using the concept of key-value pair and query. These are independent vector representations that help capture self-similarity and cross similarity between different text components at different levels—for example, word, sentence, and paragraph. Given an initial embedding, the key-value pair and the query vectors are generated via different linear projections. The dot product between query and key vectors is used to quantify the similarity between associated tokens. The value of this similarity is used to build an attention model that is defined as a weighted average of the value vectors with respect to a normalized function where the exponent is proportional to the query-key dot product. This information is used to create a weighted intermediate representation in the neural network, where the weighting scheme is proportional to the similarity between the different tokens. This scheme helps to infer the subsequent word in a given context with reduced or no need to learn long range dependencies characterizing the language.

While in neural network 200 self attention layer 210 is positioned between input layer 205 and first hidden layer 215, it is contemplated that in some examples the self attention layer may be added at a different position relative to the other layers of the neural network. In addition, while FIG. 2 shows neural network 200 as having one self attention layer 210, it is contemplated that in some examples the neural network may comprise no self attention layer, or two or more self attention layers.

Neural network 200 may also comprise a dropout applied to first hidden layer 210. Applying a dropout comprises disabling or hindering a randomly-selected subset of the neurons of a given layer of the neural network from participating in the learning or fitting process undertaken by the neural network. For example, the weights or values of the randomly-selected neurons may be set to zero or to a constant to disable or hinder them. Moreover, in some examples the randomly selected neurons may be disconnected from neighboring neurons in one or both of their neighboring layers, to hinder or disable the disconnected neurons.

In neural network 200, one-in-ten (i.e. p=0.1) of the neurons are randomly selected and dropped-out in first hidden layer 215. Second hidden layer 220, third hidden layer 225, and fourth hidden layer 230 may have similar p=0.1 dropouts applied to them. It is contemplated that in some examples the neural network may have no dropouts, or that dropouts may be applied to a subset of the hidden layers. In addition, in some examples the dropout may be at a rate of other than one-in-ten; for example, the dropouts may be two-in-ten, three-in-ten, five-in-ten, and the like.

Dropouts may be added to a neural network to counteract the tendency of the network to overfit the data. In multi-layer neural networks, additional hidden layers may be added to enhance the ability of the network to fit or learn from the data. This enhancement may have the side effect of increasing the network's tendency to overfit. Dropouts may be added to compensate for or counteract this tendency to overfit created when additional hidden layers are added to the network.

In addition, in neural network 200 layer normalizations may be applied to first hidden layer 215, third hidden layer 225, and fourth hidden layer 230. Layer normalization performs normalization over the feature dimension and makes the inputs independent. As a result, different mini-batch sizes may be used in training. Compared to other types of normalizations such as batch normalization, layer normalization may offer better results on recurrent neural networks and attention based models.

In some examples, the layer normalization implemented may be similar to the layer normalization described in (Ba, Jimmy Lei, Jamie Ryan Kiros, and Geoffrey E. Hinton. "Layer normalization." arXiv preprint arXiv:1607.06450 (2016)), which is incorporated herein by reference in its entirety. This example layer normalization technique may be implemented by computing the mean and the standard deviation of the signal along the feature dimension before the non-linear layer and renormalizing the signal to have a mean $\mu=0$ and a standard deviation of $\Delta=1$.

Moreover, in some examples other types of normalization may be used, such as batch normalization for example as described in (Ioffe, Sergey, and Christian Szegedy. "Batch normalization: Accelerating deep network training by reducing internal covariate shift." arXiv preprint arXiv: 1502.03167 (2015)), which is also incorporated herein by reference it its entirety. As is the case of layer normalization technique, the signal's statistics may be used to renormalize the original signal, along the batch dimension which means that every mini-batch will have unique statistics across the inner states. This normalization technique may not be applicable to recurrent networks, since the state's information is integrated along the "time axis". In some examples, these normalization techniques may be used to stabilize the dynamic of the hidden layers and to reduce training time.

Moreover, in some examples "Tan h" normalization may also be used. Tan h normalization may be applied to obtain quantities that have no units and sum up to one. Such quantities may be used, for example, to compute probabilities While FIG. 2 shows layer normalizations applied to the first, third, and fourth hidden layers, it is contemplated that in some examples normalization may be applied to more or fewer of the hidden layers or none of the layers. In addition, in some examples the same or similar types of normalizations may be applied to the layers which are normalized. Moreover, in some examples different types of normalizations may be applied to the layers which are normalized. The advantage of layer normalization is that it is independent of the batch size and present therefore statistics that are feature dependent and not batch size dependent. Therefore, there is less constraint in terms of batch size and this method is none expensive compared to batch normalization for example since it does not require to store the statistics for each batch or each recurrent state in the case of recurrent networks.

Furthermore, as shown in FIG. 2, second hidden layer 220 has 3072 neurons, four time as many as the neurons of input layer 205 and the other hidden layers 215, 225, and 230. Increasing the number of neurons of second hidden layer 220 relative to the other hidden layers may make neural network 200 less prone to overfitting. In some examples, second hidden layer 220 may have an increased number of neurons other than 3072. In addition, in some examples, a different hidden layer may have an increased number of neurons, or more than one of the hidden layers may have an increased number of neurons. Furthermore, it is contemplated that in some examples all the hidden layers may have the same number of neurons.

In addition, output layer 235 comprises a number of neurons corresponding to a number of the possible labels for the sentences neural network 200 is to classify. Since neural network 200 is designed to generate probabilities for three possible labels (i.e. P, I, or O), output layer 235 has three neurons. In some examples, the number of possible labels may be different, in which case the number of neurons in the output layer may also be correspondingly different.

Moreover, neural network 200 may apply a loss function that is compatible with assigning independent probabilities to each of the possible labels. For example, the loss function may comprise binary cross entropy with logits (BCEWithLogits). In some examples this loss function may be defined by the following equation:

$$E = -\sum_{i=1}^{n} (t_i \log(y_i) + (1-t_i)\log(1-y_i)) \quad (1)$$

where:

$$y_i = \frac{1}{1+e^{-s_i}} \quad (2)$$

$$s_i = \sum_{j=1} h_j w_{ji} \quad (3)$$

It is contemplated that in some examples loss functions other than equation 1 may also be used. Neural network 200 may be implemented using computer-readable instructions, hardware, or a combination of computer-readable instructions and hardware. For example, neural network 200 may be implemented using libraries written in python such as pytorch, tensorflow or Theano. In addition, in some examples the classification engine and its neural network may be implementing using specially-designed or -programmed hardware such as Graphical Processing Units.

Figure 3:
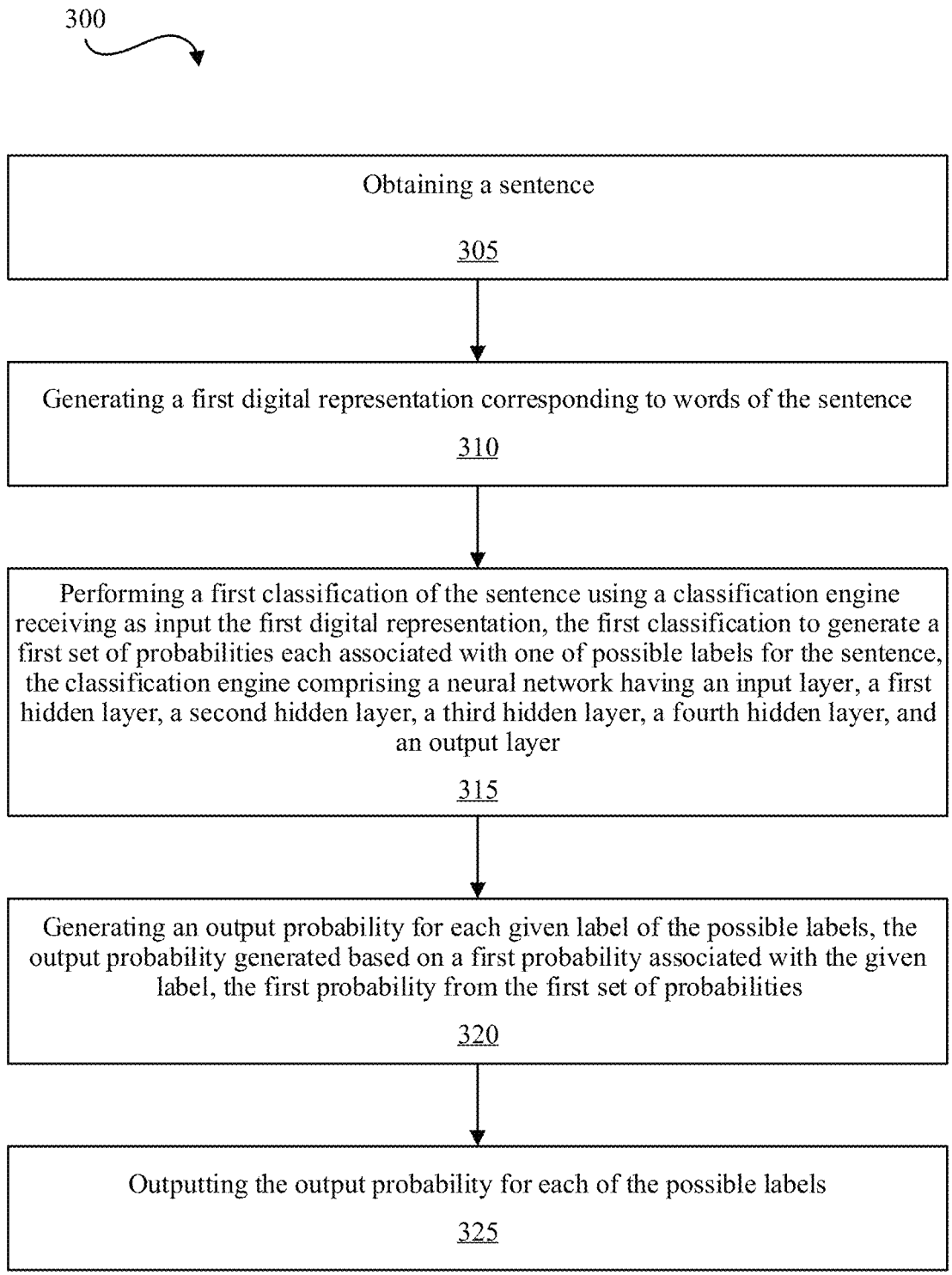
FIG. 3 shows a flowchart of another example method for multi-label classification of a sentence, in accordance with a non-limiting implementation of the present specification.

Turning now to FIG. 3, a flowchart is shown of another example method 300, which may be used for multi-label classification of a sentence. Similar to method 100, method 300 may also be used for classifying pieces or portions of text data other than a sentence, such as a phrase, paragraph, subsection, section, chapter, and the like. At box 305, the sentence may be obtained. In some examples, the sentence may be retrieved or received from a machine-readable memory, similar to the process described in relation to box 105 of method 100.

At box 310, a first digital representation corresponding to the words of the sentence may be generated. Generation of this digital representation may be similar to the generation of the first and second representations described in relation to boxes 110 and 115 of method 100. In some examples, this digital representation may be generated using BERT or Bio-BERT.

Moreover, at box 315 a first classification of the sentence may be performed using a classification engine. The classification engine may receive as input the first digital representation. Furthermore, the first classification may generate a first set of probabilities each associated with one of the possible labels for the sentence. The classification at box 315 may be similar to the classification described in relation to boxes 120 and 125 of method 100.

In addition, the classification engine may comprise a neural network having an input layer, a first hidden layer, a second hidden layer, a third hidden layer, a fourth hidden layer, and an output layer. In some examples the neural network may have a different structure, such as having fewer or more than four hidden layers. Moreover, in some examples the neural network may comprise a self attention layer between the input layer and the first hidden layer. This self attention layer may be similar to self attention layer 210 described in relation to neural network 200. In some examples the neural network may comprise more than one self attention layer, or no self attention layer.

Furthermore, in some examples the neural network may comprise at least one of a first dropout applied to the first hidden layer, a second dropout applied to the second hidden layer, a third dropout applied to the third hidden layer, and the fourth dropout applied to the fourth hidden layer. In some examples, no dropouts may be applied. The dropouts may be similar to those described in relation to neural network 200. Moreover, in some examples the neural network may be similar to neural network 200 shown in FIG. 2. It is also contemplated that in some examples the neural network of method 300 may be different than neural network 200.

In some examples the dropouts applied to the neural network may be about one-in-ten or 0.1 dropouts. Moreover, in some examples other dropouts may also be used. In addition, in some examples the hidden layers of the neural network may comprise dense linear layers. Furthermore, in some examples normalizations may be applied to one or more of the first hidden layer, the third hidden layer, and the fourth hidden layer.

In addition, in some examples the second hidden layer may comprise more neurons that the first hidden layer. For example, the second hidden layer may comprise about four times more neurons than the first hidden layer. Moreover, in some examples the output layer may comprise a number of neurons corresponding to the number of the possible labels for the sentence. Furthermore, the neural network may comprise a loss function, which may comprise binary cross entropy with logits. In some examples, the loss function may be implemented using equation 1. Moreover, in some examples a loss function other than equation 1 may also be used.

Turning now to box 320, an output probability for each given label of the possible labels may be generated based on a first probability associated with the given label. The first probability may be from the first set of probabilities. In some examples, the output probability may be the first probability. At box 325, the output probability may be output for each of the possible labels. Outputting the output probability at box 325 may be similar to outputting the output probability described in relation to box 140 of method 100.

In some examples method 300 may further comprise generating a text feature score based on the sentence. The text feature score may correspond to a text feature of the sentence. Generating this text feature score may be similar to generating the text feature score described in relation to box 130 of method 100. In addition, in such examples generating the output probability may comprise generating the output probability based on the text feature score and the first probability.

Generating the output probability based on multiple inputs such as the first probability and the text feature score may be similar to generating the output probability described in relation to box 135 of method 100. In some examples, decision trees such as LGBMs, linear combiners, or other types of boosting engines may be used to generate the output probability based on the text feature score and the first probability generate by the classification engine.

Furthermore, in some examples method 300 may further comprise generating a further text feature score based on the sentence. In such examples, generating the output probability may comprise generating the output probability based on the text feature score, the further text feature score, and the first probability. In some examples the text feature score may comprise one of the QIE score and the average TF-IDF score for the sentence while the further text feature score may comprise the other one of the QIE score and the average TF-IDF score for the sentence.

In addition, in some examples method 300 may further comprise generating a second digital representation corresponding to the words of the sentence. Generating the second digital representation may be similar to generating the digital representation discussed in relation to box 115 of method 100. In such examples, method 300 may further comprise performing a second classification of the sentence using the classification engine receiving as input the second digital representation. The second classification may generate a second set of probabilities each associated with one of the possible labels for the sentence. The second classification may be similar to the second classification described in relation to box 125 of method 100.

In some examples the first digital representation may be generated using one of BERT and Bio-BERT and the second digital representation may be generated using the other one of BERT and Bio-BERT. Similar to method 100, in some examples method 300 may be used to generate output probabilities associated with the labels of population, intervention, and outcome to be used to characterize the sentence in a medical context. These output probabilities may then be used to classify the sentence as pertaining to one or more of population, intervention, and outcome.

Figure 4:
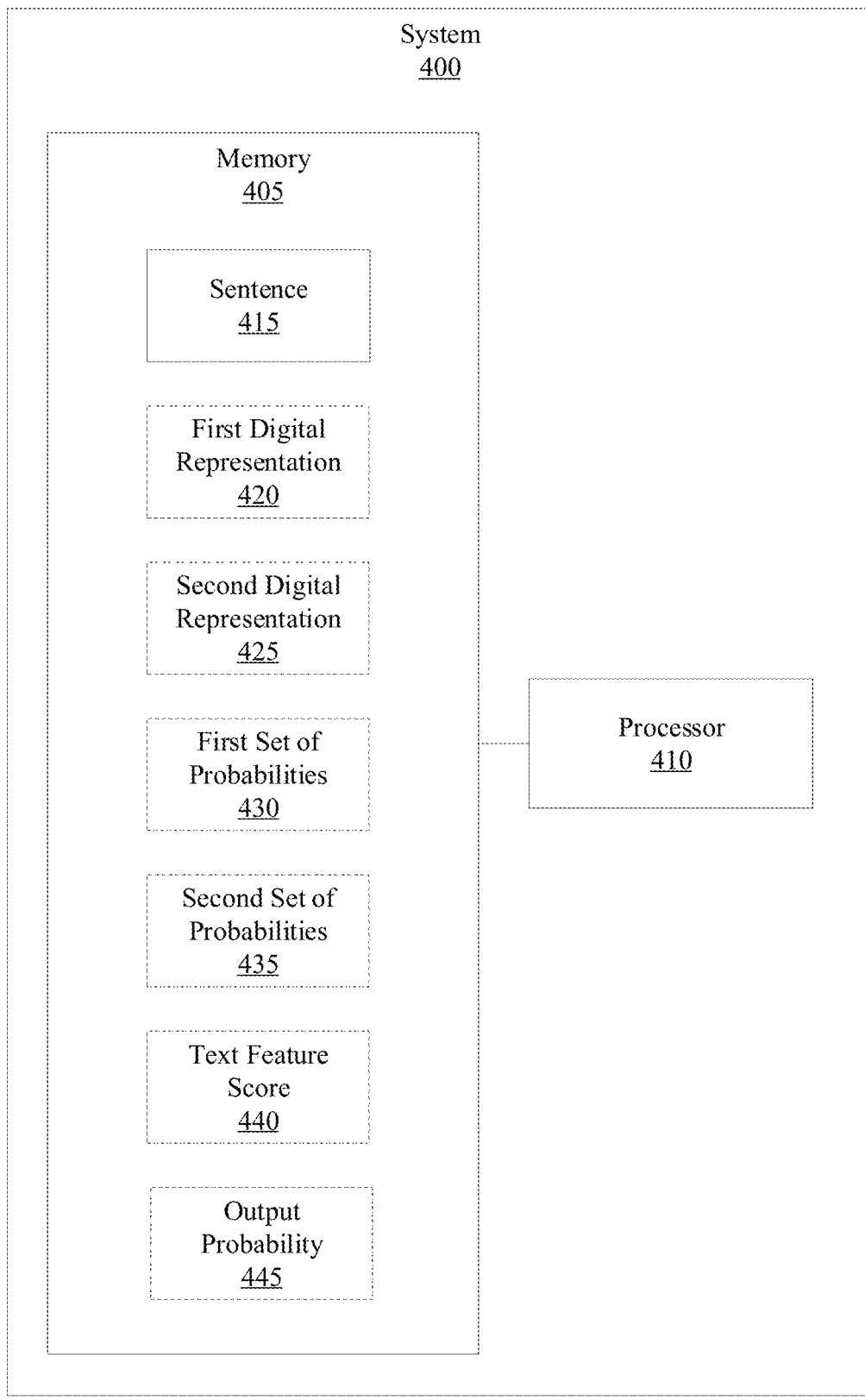
FIG. 4 shows a schematic representation of an example system, which may be used for multi-label classification of a sentence, in accordance with a non-limiting implementation of the present specification.

Turning now to FIG. 4, a schematic representation is shown of an example system 400, which may be used for multi-label classification of a sentence. System 400 comprises a memory 405 to store a sentence 415. Memory 405 may comprise a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

System 400 may also comprise a processor 410 in communication with memory 405. Processor 410 may comprise a central processing unit (CPU), a graphics processing unit (GPU), a microcontroller, a microprocessor, a processing core, a field-programmable gate array (FPGA), a virtualized or cloud-based processor, a multi-core processor, a distributed or parallelized processor, a quantum computing processor, or similar device capable of executing instructions. Processor 410 may cooperate with the memory 405 to execute instructions.

Processor 410 may receive sentence 415 from memory 405. In addition, processor 410 may generate a first digital representation 420 and a second digital representation 425 corresponding to the words of the sentence. The receiving of the sentence and generation of these digital representations may be similar to the generation of the digital representations discussed in relation to boxes 105, 110, and 115 of method 100.

Moreover, processor 410 may perform a first classification of the sentence using a classification engine receiving as input first digital representation 420. The first classification may generate a first set of probabilities 430 each associated with one of the possible labels for the sentence. Processor 410 may also perform a second classification of the sentence using the classification engine receiving as input second digital representation 425. The second classification may generate a second set of probabilities 435 each associated with one of the possible labels for the sentence.

Processor 410 may perform the classifications using neural network 200, or another suitable classification engine. Performing the first and second classifications may be similar to the first and second classifications described in relation to boxes 120 and 125 of method 100. In some examples, the classification engine may comprise a hardware component incorporated into system 400. Moreover, in some examples the classification engine may comprise computer-readable instructions stored in memory 405, or in a different storage, and executed by processor 410. Furthermore, in some examples the classification engine may comprise a combination of hardware and computer-readable instructions.

Moreover, processor 410 may generate a text feature score 440 based on the sentence. Text feature score 440 may correspond to a text feature of the sentence. Generating text feature score 440 may be similar to generating the text feature score described in relation to method 100. Processor 410 may also generate an output probability 445 for each given label of the possible labels. Output probability 445 may be generated based on text feature score 440, a first probability associated with the given label, and a second probability associated with the given label. The first probability and the second probability may be from first set of probabilities 430 and second set of probabilities 435 respectively. Generating text feature score 440 and output probability 445 may be similar to the corresponding processes described in relation to method 100.

In addition, processor 410 may also output output probability 445 for each of the possible labels. Outputting output probability 445 may be similar to outputting the output probability described in relation to box 140 of method 100. For example, to output output probability 445, processor 410 may store output probability 445 in memory 405, or in a different memory in system 400 or outside of system 400. To output output probability 445, processor 410 may also communicate output probability 445 to an output terminal such as a display or a printer, or communicate output probability 445 to another component of system 400 or outside of system 400.

Moreover, in some examples processor 410 may also assign one or more labels to the sentence based on output probability 445 associated with each of the labels. Assigning the labels to the sentence may comprise storing the label in memory in association with the sentence, or controlling or instructing an output terminal to visually or audibly associate the label with the sentence.

In some examples, processor 410 may generate first digital representation 420 using one of BERT and Bio-BERT and generate second digital representation 425 using the other one of BERT and Bio-BERT. Moreover, in some examples the classification engine may comprise a neural network, such as neural network 200 or any of the other neural networks described herein.

Furthermore, in some examples processor 410 may also generate a further text feature score based on the sentence. In such examples, processor 410 may generate the output probability based on the text feature score, the further text feature score, the first probability, and the second probability. Moreover, in some examples processor 410 may generate the QIE score and the average TF-IDF score as the text feature score and the further text feature score.

In addition, in some examples the labels may comprise population, intervention, and outcome to be used to characterize the sentence in a medical context. Moreover, in some examples, processor 410 may generate the output probability using a decision tree taking as attributes the text feature score, the first probability, and the second probability. In some examples the decision tree may comprise a light gradient boosting machine (LGBM). The details of generating the output probability based on the probabilities from the classification engine and the text feature score may be similar to the corresponding processes described in relation to method 100 and the other methods described herein.

In FIG. 4, boxes for first digital representation 420, second digital representation 425, first set of probabilities 430, second set of probabilities 435, text feature score 440, and output probability 445 are shown in dashed lines to signify that while some or all of these entities may be stored in memory 405, it is also contemplated that in some examples some or all of these entities may be stored in a different memory in system 400 or in a memory outside of system 400. In addition, system 400 may have the features and perform the functions of method 100 and the other methods described herein. In addition, system 400 may have features and perform the functions other than those of method 100 and the other methods described herein.

Figure 5:
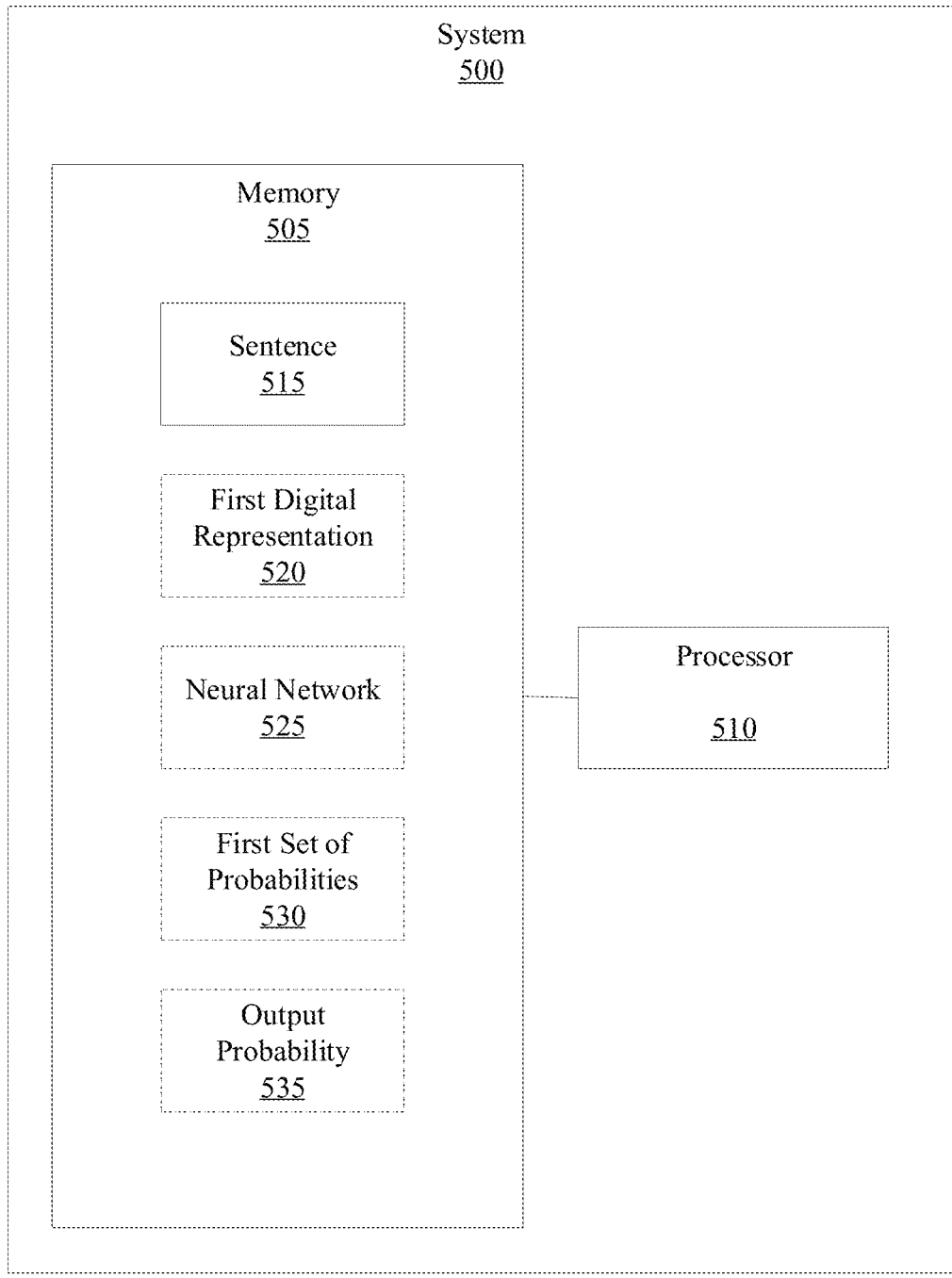
FIG. 5 shows a schematic representation of another example system, which may be used for multi-label classification of a sentence, in accordance with a non-limiting implementation of the present specification.

Turning now to FIG. 5, a schematic representation is shown of an example system 500, which may be used for multi-label classification of a sentence. System 500 may comprise a memory 505 to store sentence 515 having words. System 500 may also comprise a processor 510 in communication with memory 505. The structure of memory 505 and processor 510 may be similar to memory 405 and processor 410 described in relation to FIG. 4.

In some examples, processor 510 may receive sentence 515 form memory 505. Moreover, processor 510 may generate a first digital representation 520 corresponding to words of sentence 515. Generating the digital representation may be similar to the corresponding process described in relation to method 100. Processor 510 may also perform a first classification of sentence 515 using a classification engine receiving as input first digital representation 520. The first classification may generate a first set of probabilities 530 each associated with one of the possible labels for sentence 515. The classification engine may comprise a neural network 525.

Neural network 525 may comprise an input layer, a first hidden layer, a second hidden layer, a third hidden layer, a fourth hidden layer, and an output layer. In some examples the neural network may have a different structure, such as having fewer or more than four hidden layers. Moreover, in some examples the neural network may comprise a self attention layer between the input layer and the first hidden layer. This self attention layer may be similar to self attention layer 210 described in relation to neural network 200.

Furthermore, in some examples the neural network may comprise at least one of a first dropout applied to the first hidden layer, a second dropout applied to the second hidden layer, a third dropout applied to the third hidden layer, and a fourth dropout applied to the fourth hidden layer. In some examples, no dropouts may be applied. The dropouts may be similar to those described in relation to neural network 200. Moreover, in some examples the neural network may be similar to neural network 200 shown in FIG. 2. It is also contemplated that in some examples the neural network of system 500 may be different than neural network 200.

In some examples the dropouts applied to the neural network may be about one-in-ten or 0.1 dropouts. Moreover, in some examples other dropouts may also be used. In addition, in some examples the hidden layers of the neural network may comprise dense linear layers. Furthermore, in some examples normalizations may be applied to one or more of the first hidden layer, the third hidden layer, and the fourth hidden layer.

In addition, in some examples the second hidden layer may comprise more neurons than the first hidden layer. For example, the second hidden layer may comprise about four times more neurons than the first hidden layer. Moreover, in some examples the output layer may comprise a number of neurons corresponding to the number of the possible labels for the sentence. Furthermore, the neural network may comprise a loss function, which may comprise binary cross entropy with logits. In some examples, the loss function may be implemented using equation 1. Moreover, in some examples a loss function other than equation 1 may also be used.

Processor 510 may also generate an output probability 535 for each given label of the possible labels. Output probability 535 may be generated based on a first probability associated with the given label, which first probability may be from first set of probabilities 530. Generating output probability 535 may be similar to the process described in relation to box 320 of method 300. In some examples, the output probability may be the first probability.

Moreover, processor 510 may output output probability 535 for each of the possible labels. Outputting output probability 535 may be similar to outputting the output probability described in relation to box 140 of method 100. For example, to output output probability 535, processor 510 may store output probability 535 in memory 505, or in a different memory in system 500 or outside of system 500. To output output probability 535, processor 510 may also communicate output probability 535 to an output terminal such as a display or a printer, or communicate output probability 535 to another component of system 500 or outside of system 500.

Moreover, in some examples processor 510 may also assign one or more labels to the sentence based on output probability 535 associated with each of the labels. Assigning the labels to the sentence may comprise storing the labels in memory in association with the sentence, or controlling or instructing an output terminal to visually or audibly associate the label with the sentence.

In some examples processor 510 may generate the first digital representation using BERT or Bio-BERT. Furthermore, in some examples processor 510 may also generate a text feature score based on the sentence. The text feature score may correspond to a text feature of the sentence. Generating this text feature score may be similar to generating the text feature score described in relation to box 130 of method 100. In addition, in such examples generating the output probability may comprise generating the output probability based on the text feature score and the first probability.

Generating the output probability based on multiple inputs such as the first probability and the text feature score may be similar to generating the output probability described in relation to box 135 of method 100. In some examples, decision trees such as LGBMs, linear combiners, or other types of boosting engines may be used to generate the output probability based on the text feature score and the first probability generate by the classification engine.

Furthermore, in some examples processor 510 may also generate a further text feature score based on the sentence. In such examples, generating the output probability may comprise generating the output probability based on the text feature score, the further text feature score, and the first probability. In some examples the text feature score may comprise one of the QIE score and the average TF-IDF score for the sentence, while the further text feature score may comprise the other one of the QIE score and the average TF-IDF score for the sentence.

In addition, in some examples processor 510 may also generate a second digital representation corresponding to the words of the sentence. Generating the second digital representation may be similar to generating the digital representation discussed in relation to box 115 of method 100. In such examples, processor 510 may also perform a second classification of sentence 515 using the classification engine receiving as input the second digital representation. The second classification may generate a second set of probabilities each associated with one of the possible labels for the sentence. The second classification may be similar to the second classification described in relation to box 125 of method 100.

In some examples the first digital representation may be generated using one of BERT and Bio-BERT and the second digital representation may be generated using the other one of BERT and Bio-BERT. In some examples, processor 510 may generate output probabilities associated with the labels of population, intervention, and outcome to be used to characterize the sentence in a medical context. As discussed above, processor 510 may use these output probabilities to classify the sentence as pertaining to one or more of population, intervention, and outcome.

In FIG. 5, boxes for first digital representation 520, neural network 525, first set of probabilities 430, and output probability 535 are shown in dashed lines to signify that while some or all of these entities may be stored in memory 505, it is also contemplated that in some example some of all of these entities may be stored in a different memory in system 500 or in a memory outside of system 500. In addition, system 500 may have the features and perform the functions of method 300 and the other methods described herein. In addition, system 500 may have features and perform functions other than those of method 300 and the other methods described herein.

While FIG. 5 shows neural network 525 as being stored in memory 505, it is contemplated that in some examples the neural network may be a separate or freestanding module in system 500. This module may comprise specialized hardware, computer-readable instructions, or a combination of hardware and computer-readable instructions. In some examples, the specialized hardware may comprise parallel or parallelized processors, multi-core processors, graphical processing units, neural network-optimized processing cores, and the like.

Figure 6:
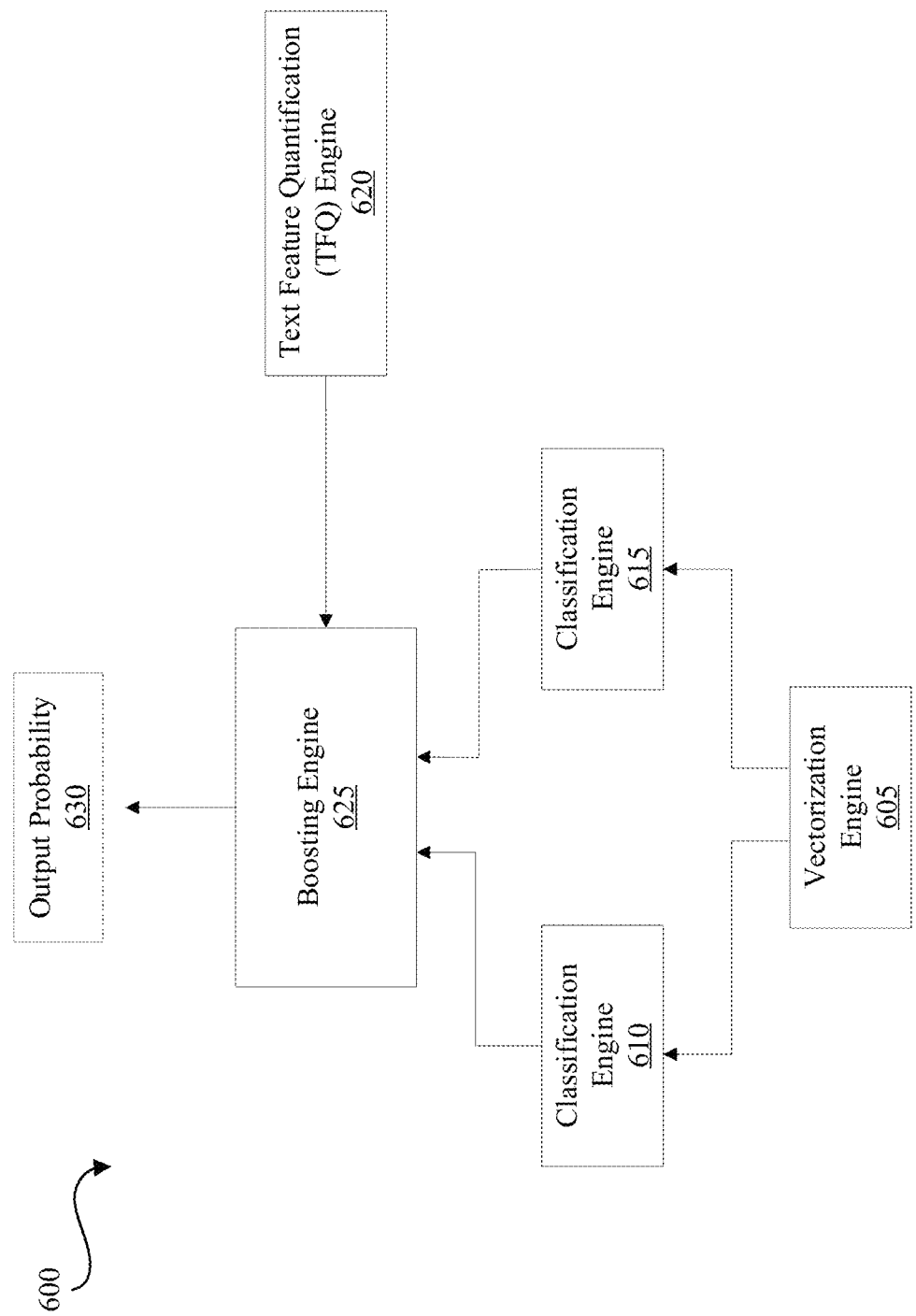
FIG. 6 shows a schematic representation of yet another example system, which may be used for multi-label classification of a sentence, in accordance with a non-limiting implementation of the present specification.

Turning now to FIG. 6, a schematic representation is shown of an example system 600, which may be used for multi-label classification of a sentence or other pieces of text data. System 600 comprises a vectorization engine 605, which comprises a first memory module comprising a first memory to store the sentence and its words. The first memory may be similar to memory 405 described in relation to FIG. 4. Vectorization engine 605 may also comprise a first processor module comprising a first processor in communication with the first memory. The first processor may be similar to processor 410 described in relation to FIG. 4. In some examples the first processor module may comprise one or more processors which may be virtualized, cloud-based, parallelized, multi-core, or the like.

The first processor module may generate a first digital representation and a second digital representation corresponding to the words of the sentence. Generation of these digital representations may be similar to those described in relation to boxes 110 and 115 of method 100. In some examples the first processor module may generate the first digital representation using one of BERT and Bio-BERT and the second digital representation using the other of BERT and Bio-BERT.

System 600 also comprises a first classification engine 610 in communication with vectorization engine 605. First classification engine 610 comprises a second memory module comprising at least one of the first memory and a second memory. In some examples the second memory may be similar in structure to the first memory. Engine 610 also comprises a second processor module comprising at least one of the first processor and a second processor. In some examples the second processor may be similar in structure to the first processor. The second processor module may be in communication with the second memory module. The second processor module is to perform a first classification of the sentence using as input the first digital representation. The first classification may generate a first set of probabilities each associated with one of the possible labels for the sentence.

System 600 also comprises a second classification engine 615 in communication with vectorization engine 605. Second classification engine 615 comprises a third memory module comprising at least one of the second memory module and a third memory. In some examples the third memory may be similar in structure to the second memory. Engine 615 also comprises a third processor module comprising at least one of the second processor module and a third processor. In some examples the third processor may be similar in structure to the second processor. The third processor module may be in communication with the third memory module. The third processor module is to perform a second classification of the sentence using as input the second digital representation. The second classification may generate a second set of probabilities each associated with one of the possible labels for the sentence.

In some examples at least one of first classification engine 610 and the second classification engine 615 comprises a neural network. Moreover, in some examples the neural network may comprise an input layer, a first hidden layer, a second hidden layer, a third hidden layer, a fourth hidden layer, and an output layer. Furthermore, in some examples the neural network may comprise neural network 200 or another one of the neural networks described herein.

System 600 may also comprise text feature quantification (TFQ) engine 620. TFQ engine 620 may comprise a fourth memory module comprising at least one of the third memory module and a fourth memory. The fourth memory may be similar in structure to the third memory. TFQ engine 620 may also comprise a fourth processor module comprising at least one of the third processor module and a fourth processor. The fourth processor may be similar in structure to the third processor. The fourth processor module may be in communication with the fourth memory module. Moreover, the fourth processor module may generate a text feature score based on the sentence. The text feature score may correspond to a text feature of the sentence.

System 600 also comprises a boosting engine 625 in communication with first classification engine 610, second classification engine 615, and TFQ engine 620. Boosting engine 625 may comprise a fifth memory module comprising at least one of the fourth memory module and a fifth memory. The fifth memory may be similar in structure to the fourth memory. Boosting engine 625 may also comprise a fifth processor module comprising at least one of the fourth processor module and a fifth processor. The fifth processor may be similar in structure to the fourth processor. The fifth processor module is in communication with the fifth memory module. The fifth processor module may generate an output probability 630 for each given label of the possible labels. Output probability 630 may be generated based on the text feature score, a first probability associated with the given label, and a second probability associated with the given label. The first probability and the second probability may be from the first set of probabilities and the second set of probabilities respectively.

Moreover, in some examples the fifth processor module may further output the output probability 630 for each of the possible labels. Outputting the output probability may be similar to the corresponding outputting described in relation to FIGS. 1-5. Furthermore, in some examples the fourth processor module may also generate a further text feature score based on the sentence, and the fifth processor module may generate the output probability based on the text feature score, the further text feature score, the first probability, and the second probability.

In addition, in some examples to generate the text feature score the fourth processor module may calculate the QIE score, i.e. a ratio of a number of quantitative features of the sentence to a corrected number of the words of the sentence. In such examples, to generate the further text feature score the fourth processor module may calculate an average text frequency inverse document frequency (TF-IDF) score for the sentence.

Moreover, in some examples boosting engine 625 may comprise a decision tree such as LGBM. The LGBM may be implemented using specially-designed or specially-programmed hardware, using computer-readable instructions, or a combination of hardware and computer-readable instructions.

System 600 may have the features and perform the functions described herein in relation to FIGS. 1-5, and the other methods and systems described herein. In addition, while FIG. 6 shows the components of system 600 as being separate engines, it is contemplated that in some examples some or all of vectorization engine 605, first and second classification engines 610 and 615, TFQ engine 620 and boosting engine 625 may share the same memory and processor.

Figure 7:
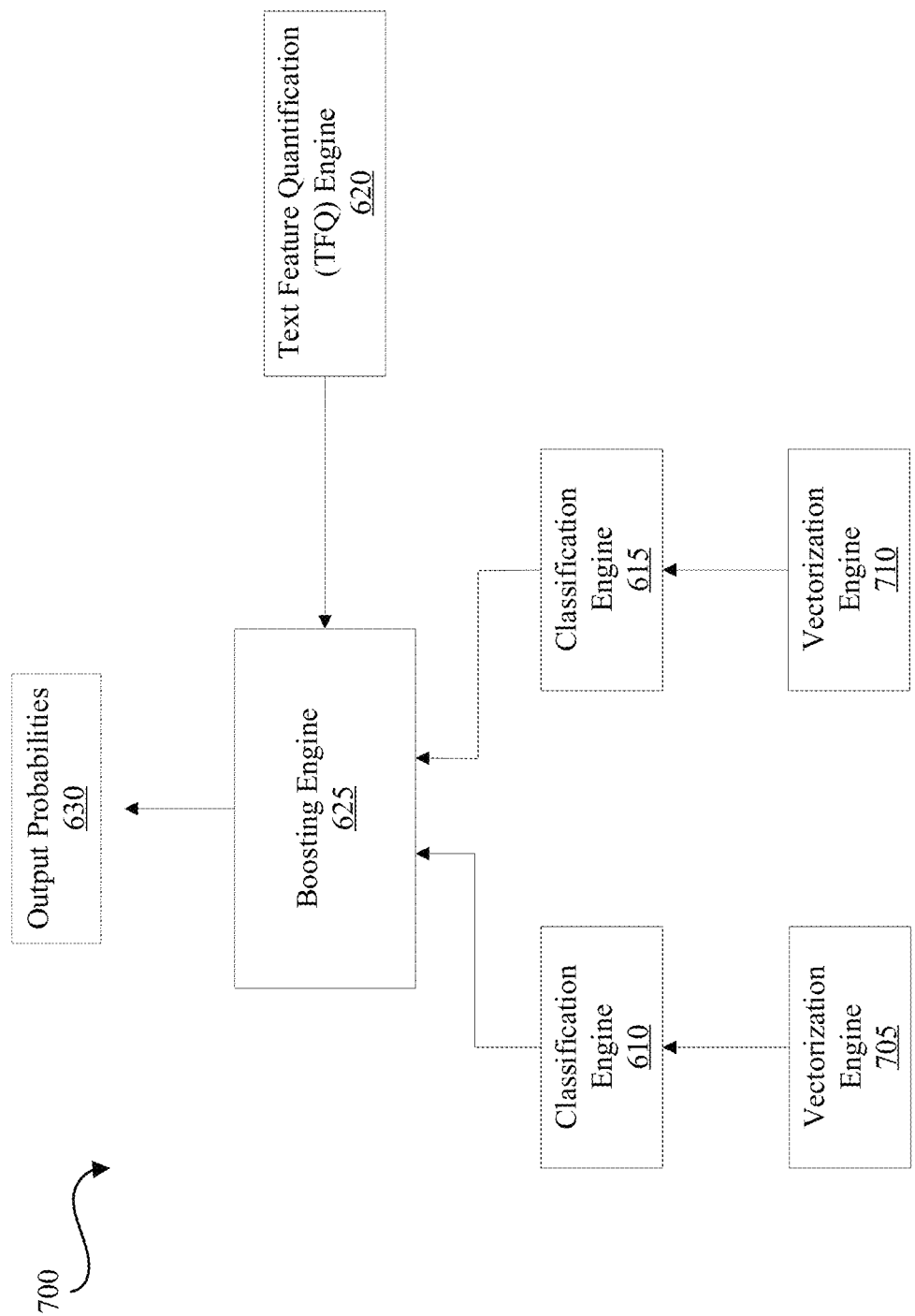
FIG. 7 shows a schematic representation of yet another example system, which may be used for multi-label classification of a sentence, in accordance with a non-limiting implementation of the present specification.

Turning now to FIG. 7, a schematic representation is shown of an example system 700, which may be used for multi-label classification of a sentence. System 700 may be similar to system 600, which a difference being that system 700 comprises two separate vectorization engines 705 and 710. The structure of vectorization engines 705 and 710 may be similar to the structure of vectorization engine 605.

Vectorization engine 705 is in communication with first classification engine 610 and vectorization engine 710 is in communication with second classification engine 615. Vectorization engine 705 may generate the first digital representation corresponding to the words of the sentence, which first digital representation is then used by first classification engine 610 as its input. Similarly, vectorization engine 710 may generate the second digital representation corresponding to the words of the sentence, which second digital representation is then used by second classification engine 615 as its input.

Turning now to FIG. 8, a schematic representation is shown of an example non-transitory computer-readable storage medium (CRSM) 800, which may comprise an electronic, magnetic, optical, or other physical storage device that stores executable instructions. CRSM 800 may comprise instructions executable by a processor. The instructions may comprise instructions 805 to cause the processor to receive a sentence from a machine-readable memory.

In addition, the instructions may comprise instructions 810 to generate a first digital representation corresponding to words of the sentence and instructions 815 to generate a second digital representation corresponding to the words of the sentence. Moreover, the instructions may comprise instructions 820 to perform a first classification of the sentence using a classification engine receiving as input the first digital representation. The first classification may generate a first set of probabilities each associated with one of the possible labels for the sentence. Furthermore, the instructions may comprise instructions 825 to perform a second classification of the sentence using the classification engine receiving as input the second digital representation. The second classification may generate a second set of probabilities each associated with one of the possible labels for the sentence.

The instructions may also comprise instructions 830 to generate a text feature score based on the sentence. The text feature score may correspond to a text feature of the sentence. In addition, the instructions may comprise instructions 835 to generate an output probability for each given label of the possible labels. The output probability may be generated based on the text feature score, a first probability associated with the given label, and a second probability associated with the given label. The first probability and the second probability may be from the first set of probabilities and the second set of probabilities respectively. Moreover, the instructions may comprise instructions 840 to output the output probability for each of the possible labels.

CRSM 800, and the instructions stored herein, may cause a processor to perform the functions of method 100 and the other methods described herein. Turning now to FIG. 9, a schematic representation is shown of an example non-transitory computer-readable storage medium (CRSM) 900, which may comprise an electronic, magnetic, optical, or other physical storage device that stores executable instructions. CRSM 900 may comprise instructions executable by a processor. The instructions may comprise instructions 905 to obtain a sentence and instructions 910 to generate a first digital representation corresponding to the words of the sentence.

The instructions may also comprise instructions 915 to perform a first classification of the sentence using a classification engine receiving as input the first digital representation. The first classification may generate a first set of probabilities each associated with one of the possible labels for the sentence. The classification engine may comprise a neural network. In some examples the neural network may comprise an input layer, a first hidden layer, a second hidden layer, a third hidden layer, a fourth hidden layer, and an output layer.

Moreover, the instructions may comprise instructions 920 to generate an output probability for each given label of the possible labels. The output probability may be generated based on a first probability associated with the given label, which first probability may be from the first set of probabilities. The instructions may also comprise instructions 925 to output the output probability for each of the possible labels. CRSM 900, and the instructions stored herein, may cause a processor to perform the functions of method 300 and the other methods described herein.

The methods, systems, and CRSMs described herein may include the features and perform the functions described herein in association with any one or more of the other methods, systems, and CRSMs described herein.

In examples described herein where the classification engine comprises a neural network, the network may be trained on a training dataset before using the neural network to classify sentences. In the PIO medical context, in some examples a training dataset may be generated from a selection of the abstracts of medical publications. In some examples, this dataset may be created by collecting structured abstracts from PubMed™ and choosing abstract headings representative of the desired categories or labels.

PubMed™ may be searched for structured abstracts using the following filters: Article Types (Clinical Trial), Species (Humans), and Languages (English). Then a lemmatization of the abstract section labels may be performed in order to cluster similar categories together. For example, abstract sections labelled "subject" and "subjects" would be grouped together under "population" in the PIO scheme.

Moreover, when the abstract sections include more than once sentence, the whole section may be retained as one training datum, instead of breaking the section down into individual sentences. Individual sentences from long abstract sections may have low or no correspondence to the labels of their respective abstract sections. By keeping the abstract sections whole and avoiding dividing them into their constituent sentences, the likelihood may be increased of the whole section corresponding to that section's label.

For abstract sections with labels such as "population and intervention" multi-labels may be created and assigned. In addition, abstract sections that do not relate to population, intervention, or outcome may also be included in the training dataset as negative training examples. Moreover, the extracted abstract sections may be further cleaned up to enhance the quality of the training dataset. For example, very short or very long abstract sections may be removed from the training dataset, as such outlier abstract sections may be relatively less informative or less relevant as training data points. For example, abstract sections having fewer than 5 words or more than 200 words may be removed from the training dataset.

In addition, the abstract sections may be assessed to ensure they are all in the same language, for example English. The abstract sections may be further cleaned up by ensuring that symbols and Unicode characters are used consistently. For example, Greek letters may be converted to their corresponding English name to ensure consistency among the abstract sections. In addition, symbols such as '≤' which may have different variants in different symbol libraries may be detected and made uniform across the abstract sections.

Once the training dataset is prepared, the neural network and the LGBM may be trained on parts of the training dataset. For example, in one example training regimen the embedding layer of the neural network may be frozen during the first epoch (i.e. the embedding vectors are not updated). In the example of neural network 200, input layer 205 may be the embedding layer. After the first epoch, the embedding layer may be unfrozen and the vectors may be fine-tuned for the classification task during training. This regimen may allow for reducing the number of the learnable parameters of the neural network that would need to be learned from scratch.

In examples where an LGBM is used to generate the output probability based on input from the probabilities form the classification engines and the text feature scores, the LGBM may also be trained using the training dataset. In one example, 60% of the training dataset was used to train the neural network of the classification engine, and a five-fold cross-validation framework was used to train the LGBM on the remaining 40% of the training dataset. The LGBM may be trained on four folds and tested on the excluded one, and process repeated for all five folds. This training regime may reduce or avoid information leakage between the training of the neural network and the training of the LGBM.

Using the training dataset and the training regimens described herein, various versions of the classification systems and methods described herein were trained and tested. The classification systems and methods were based on neural network 200. In order to quantify the performance of the classification methods and systems, precision and recall scores were computed for these systems and methods. On average, it was found that better classification results were obtained when the digital representations are provided using the Bio-BERT compared to BERT. In addition, the performance of the PIO classifier systems and methods were measured by averaging the three Area Under Receiver Operating Characteristic Curve (ROC AUC) scores for P, I, and O. The ROC AUC score of 0.9951 was obtained when using BERT to provide the digital representations of sentences. This score was improved to 0.9971 when using Bio-BERT, which is pre-trained on medical context. The results are illustrated in Table 1. The results presented in Table 1 are associated with classification of the abstracts of medical articles.

In Table 1, the F1 measured is defined as a harmonic average of precision and recall. Precision, in turn, may be defined as the ratio of true positives over to the sum of true and false positives. Recall may be defined as the ratio of true positives to the sum of true positives and false negatives.

When the LGBM boosting engine was used to generate the output probability using the probabilities from the classification engines as well as the text feature scores, the highest average ROC AUC score of 0.9998 was obtained in the case of combining the first and second probabilities (from the two classifications using respectively the first and second digital representations generated by BERT and Bio-BERT) with the average TF-IDF score and the QIEF.

TABLE 1

| Model | ROC AUC | F1 |
|---|---|---|
| BERT | 0.9951 | 0.9666 |
| Bio-BERT | 0.9971 | 0.9697 |
| BERT + TF-IDF + QIEF | 0.9981 | 0.9784 |
| Bio-BERT + TF-IDF + QIEF | 0.9996 | 0.9793 |
| BERT + Bio-BERT + TF-IDF + QIEF | 0.9998 | 0.9866 |

The multi-label classification methods and systems described herein provide enhanced performance and improved precision and recall scores for classifying sentences in the PIO medical context. As such, the methods and systems described herein constitute an improvement to the technical area of computer-based, multi-label classification. In addition, the systems described herein constitute improved multi-label classification computers.

In the examples described above, the training datasets were based on the labelled abstracts of medical articles. Obtaining training datasets based on the full text of the articles may pose a challenge due to the lack of annotated full article text data. In some examples, the noises that characterize respectively abstract and full text data may be different in nature due to the difference in information content. For example, the full text may treat in detail the intervention and outcome of a specific randomized controlled trial, whereas the abstract may only describe, at a high level, the adopted approach. A data programming approach may be used to obtain or generate training datasets based on the full text of articles, such as medical articles, and the like.

In some examples, Snorkel, an algorithmic labeling system, along with Unified Medical Language System (UMLS) tools and concepts may be used to automatically annotate unlabelled full text data in documents such as medical articles and the like. The resulting labeled data may then be used to train the multi-class classification engines and retrieve PIO elements from biomedical papers. In these examples, using data programming improves the classification compared to the case where only abstracts, extracted using the PubMed search engine, are used to train the classification engines.

In the medical context, common usage of numerous synonyms for the same word in medical literature may pose a challenge for natural language processing systems. For instance, Hodgkins disease, Hodgkin's disease NOS, and Lymphogranulomatosis may all refer to Hodgkin's disease. A metathesaurus in UMLS groups them all under one entity referred to as a "concept". These concepts are highly useful since they group the medical terms that have the same meaning. Lexical tools are also provided by UMLS such as metamap to extract concepts for a sentence. The concept based labeling functions that are created may be highly precise, with a low degree of correlation, and with embedded expert knowledge.

The challenge of insufficient labeled data constitutes a bottleneck in terms of leveraging supervised deep neural networks for Natural Language Processing (NLP) tasks. Hand-labeling tends to be expensive and time-consuming. Snorkel, which is based on data programming, is a system used to automatically label and manage training data. An example implementation of Snorkel is described in (Stephen H. Bach et al. 2017. "Snorkel: Rapid training data creation with weak supervision." In *Proceedings of the VLDB Endowment* 11, no. 3, pages 269-282), which is incorporated herein by reference in its entirety.

Snorkel is based on the principle of modelling votes from labelling functions as a noisy signal about the true labels. The model is generative and takes into account agreement and correlation between labelling functions, which labelling functions are based on different heuristics. A true class label is modeled as a latent variable and the predicted label is obtained in a probabilistic form (i.e. as a soft label).

Statistical dependencies characterizing the labelling functions and the corresponding accuracy may be modelled. Another factor to consider is propensity, which quantifies and qualifies the density of a given labelling function, i.e., the ratio of the number of times the labelling function is applicable and outputs a label to the original number of unlabeled data. In order to construct a model, the labelling functions may be applied to the unlabeled data points. This will result in label matrix $\Lambda$, where $\Lambda_{i,j} = \Lambda_{i,j}(x_i)$; here, $x_i$ represents the $i^{th}$ data point and $\lambda_j$ is the operator representing the $j^{th}$ labelling function. The probability density function $p_w(\Lambda, Y)$ may then be constructed using the three factor types that represent the labelling propensity, accuracy, and pairwise correlations of labelling functions:

$$\Phi_{i,j}^{Lab}(\Lambda, Y) = \mathbb{1}\{\Lambda_{i,j} \neq \emptyset\} \quad (4)$$

$$\Phi_{i,j}^{Acc}(\Lambda, Y) = \mathbb{1}\{\Lambda_{i,j} = y_i\} \quad (5)$$

$$\Phi_{i,j,k}^{Corr}(\Lambda, Y) = \mathbb{1}\{\Lambda_{i,j} = \Lambda_{i,k}\}(j,k) \in C. \quad (6)$$

$\mathbb{1}$ is an operator representing a value 1 when the condition between brackets is satisfied and 0 otherwise.

A concatenation of these factor tensors for the labelling functions j=1, ..., n and the pairwise correlations C are defined for a given data point $x_i$ as $\phi_i(\Lambda, Y)$. A tensor of weight parameters $w \in \mathbb{R}^{2n+|C|}$ is also defined to construct the probability density function:

$$p_w(\Lambda, Y) = Z_w^{-1} \exp\left(\sum_{i=1}^{m} w^T \phi_i(\Lambda, y_i)\right) \quad (7)$$

where $Z_w$ is the normalizing constant. In order to learn the parameter w without access to the true labels Y the negative log marginal likelihood given the observed label matrix is minimized:

$$\hat{w} = \arg\min_{w} -\log \sum_{Y} p_w(\Lambda, Y) \quad (8)$$

The trained model is then used to obtain the probabilistic training labels, $\hat{Y} = p_{\hat{w}}(Y/\Lambda)$, also referred to as soft labels. This model may also be described as a generative model. The generative model may also be described as a generative engine. Obtaining the soft labels for a portion of a document may be referred to as soft labelling that portion. In some examples, such a portion may comprise a sentence, a collection of sentences, a paragraph, a subsection, a section, and the like.

UMLS and its metamap tool may be used to automatically extract concepts from medical corpora and, based on heuristic rules, create labelling functions. In some examples, a labelling function may accept as input a candidate object and either output a label or abstain. The set of possible outputs of a specific labelling function may be expanded to include, {positive(+1), abstain(0), negative(−1)} for each of the following classes, population, intervention, and outcome. It is contemplated that similar labeling functions with expanded output sets may also be applied in classification tasks other than medical PIO classification.

Given a sentence $x_i$ as input, an indicator function $\theta_c$ may be defined as the following operator:

$$\theta_c(x_i) = \begin{cases} +1 & \text{if } c \in x_i \\ 0 & \text{otherwise} \end{cases} \quad (9)$$

where c is a given concept, defined in the UMLS. The labels positive and abstain are represented by +1 and 0 respectively. In order to construct a labelling function, the correlation of the presence of a concept in a sentence with each PIO class may be taken into account. The labelling function for given class j and concept c may be defined as:

$$\lambda_c(j, x_i) = \begin{cases} \theta_c(x_i) & \text{if } f_j(c) = \max F_c \\ -1 & \text{if } f_j(c) \neq \max F_c \end{cases} \quad (10)$$

where $F_c$ represents the set of frequencies, $f_k(c)$, of occurrence of concept c in the ensemble of sentences of class $k \in \{P, I, O\}$. Such a frequency-based approach may allow the labelling function to assign a positive label to a given sentence in relation to a concept c where the frequency of occurrence of concept c in the given sentence is greater than (or the maximum of) the frequencies of occurrences of concept c in an ensemble or subset of sentences. For example, if the subset includes three sentences with concept c occurring once in sentence one, twice in sentence two, and three times in sentence three, then sentence three is assigned a positive label in relation to concept c, and sentences one and two are assigned negative labels. In some examples, this subset may comprise a portion of, or all of, the text of a medical article.

Such a frequency-based approach to labelling may increase the likelihood of a positive label being assigned to a given sentence in which a concept c is present and relatively significant. The presence and relative significance of concept c in such a given sentence may, in turn, increase the effectiveness or value of the labelled given sentence as part of a training dataset for training a classification engine. In addition, while equation 10 uses maximum frequency, it is contemplated that in some examples, other frequency-based measures may be used, such as TF-IDF, and the like.

In some examples, labelling functions such as the one shown in equation 10 may be used to allow for the determination of soft labels, for example using equation 8, and the like. These soft labels may then be used to train the classification engines described herein. Moreover, in some examples, a plurality of labelling functions may be used to increase the accuracy of the soft labels. The number of the labelling functions used, and the manner in which the output of the labelling functions are combined or aggregated to form the basis of the soft labels, may impact the ultimate performance of the multi-label classifications described herein. In some examples, the number of the labelling functions used, and the manner in which their outputs are combined, may be adjusted to adjust or optimize the performance of the multi-label classifications and classifier systems described herein.

The number of labelling functions used may also be described as the density of the labelling functions, with a higher density corresponding to a larger number of labelling functions. The modes of combining the outputs of the labelling functions may comprise majority vote, weighted combinations, and the like. An example of weighted combinations may include weighted majority vote, and the like. In order to quantify increases in classification performance as a function of labelling function density and the mode of combining the outputs of the labelling functions, a modelling advantage may be defined.

In some examples, the modelling advantage may be estimated or calculated based on the difference between the classification performance associated with unweighted majority vote and weighted majority vote, as a function of labelling function density. In some such examples, the unweighted majority vote of n labelling functions on data points $x_i$ may be defined as $f_w(\Lambda_i) = \Sigma_{j=1}^n w_j \Lambda_{i,j}$. The weighted majority vote may then be defined as $f_1(\Lambda_i) = \Sigma_{j=1}^n \Lambda_{i,j}$. Modeling advantage, $A_w$, may be defined as the number of times the weighted majority vote of the labelling functions on data points $x_i$ correctly disagree with the unweighted majority vote of the labeling functions:

$$A_\omega(\lambda, y) = \frac{1}{m} \sum_{1}^{m} (\mathbb{1}\{y_i f_\omega(\Lambda_i) > 0 \land y_i f_1(\Lambda) \le 0\} - \mathbb{1}\{y_i f_\omega(\Lambda_i) \le 0 \land y_i f_1(\Lambda_i) > 0\}) \quad (11)$$

A label density, $d_\Lambda$, may be defined as a parameter of interest in terms of indicating the potential importance of the learned weights of the generative model. Label density is proportional to the ratio of the number of times a given labelling function is applicable to the total number of entries. It is found that it is at a middle-density regime where optimal performance and correct divergence from majority vote are achieved. These results were obtained by estimating the modeling advantage for different density regimes. Label density may also provide a measure of, or be correlated with, labelling function density.

In one example, to obtain the abovementioned results indicating optimal performance at middle-density three datasets were used: 1) Piconet, which includes 33,000 labeled abstracts; 2) 997 sentences, hand-labelled by a subject matter expert on full text (full article/paper); and 3) 300,000 full text sentences, soft-labelled using Snorkel. The hand labelled data was used as a test set. The generative model was trained on a set of 10,000 hand labelled Piconet abstracts. The classification was performed using a classification engine comprising neural network 200 and using a BioBERT embedding, with neural network 200 being trained on soft labels generated by the generative model.

Figure 10:
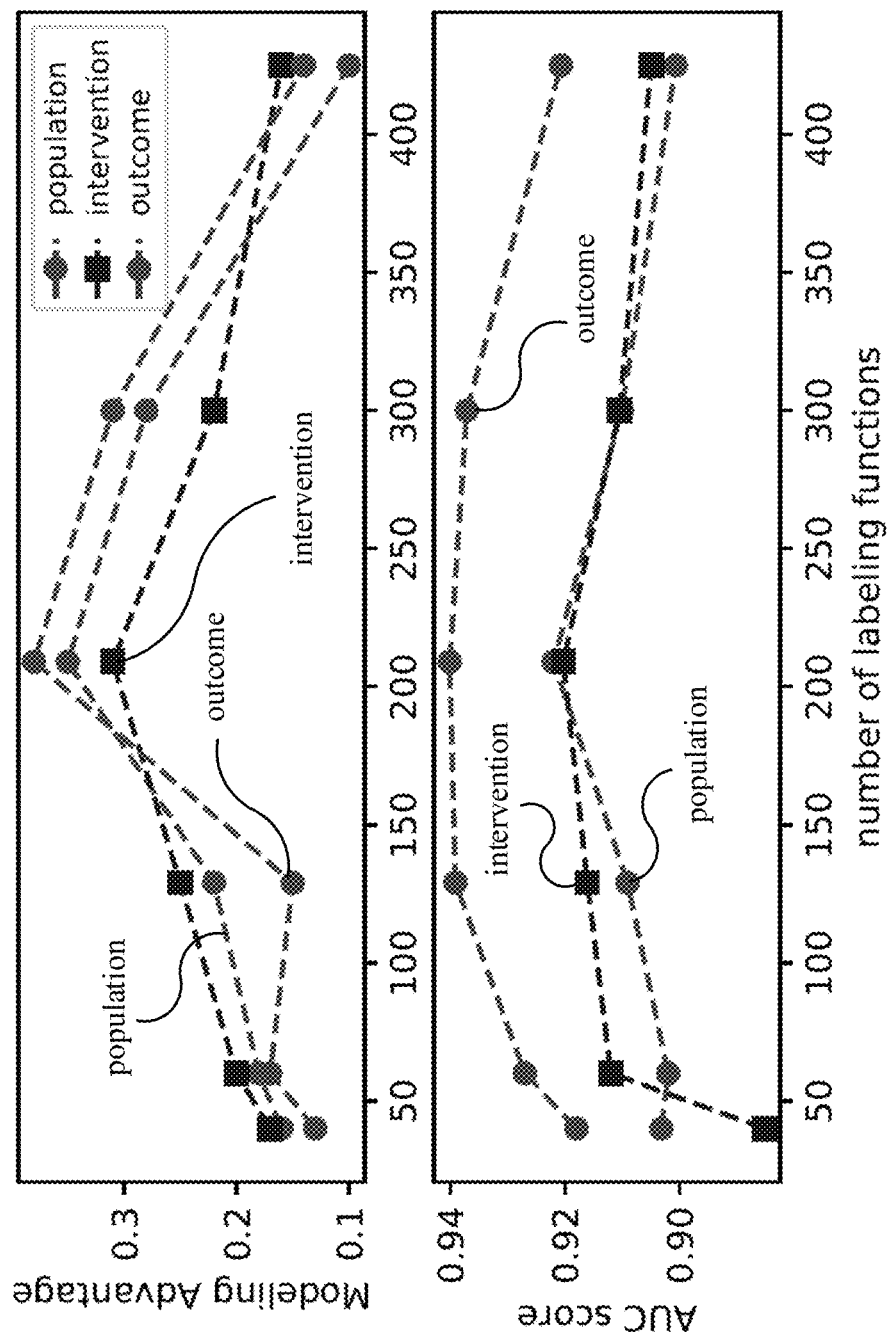
FIG. 10 shows example graphs of modelling advantage and AUC score as a function of the number of labelling functions, in accordance with a non-limiting implementation of the present specification.

FIG. 10 illustrates the variation of the modeling advantage with the number of labelling functions. This variation data is obtained by imposing a filter to the labelling functions with different accuracy and coverage thresholds. A correlation is observed between the modeling advantage and the AUC score of the classification engine, trained on the correspondingly soft labels. The modeling advantage and AUC score are both optimal within the medium label density regime.

In the example results summarized in FIG. 10, the medium label density regime may comprise a number of labelling functions in the range of about 130 to about 300. Moreover, in some examples, the medium label density regime may comprise a number of labelling functions in the range of about 175 to about 225. Furthermore, in some examples, the medium label density regime may comprise a number of labelling functions in the range of about 195 to about 215. It is contemplated that in some examples, the range of the number of labelling functions, and the subrange of the number of labelling functions corresponding to the "medium label density regime" may be different than those described in relation to FIG. 10.

Table 2 shows a comparison of the AUC scores of the classification engine associated with FIG. 10 trained on soft labeled full text using the optimal weights, with the AUC scores of other classification engines trained on hand-labeled Piconet abstracts, as described in (Mezaoui, H. et al. 2019. "Enhancing pio element detection in medical text using contextualized embedding." In *Computation and Language* (cs.CL). arXiv preprint arXiv:1906.11085), which is incorporated herein by reference in its entirety. The AUC scores presented in Table 2 are associated with classification of the full text of medical articles. The classification engine associated with FIG. 10 and described in relation thereto may also be referred to as the "instant classification engine".

Table 2 also shows a comparison of the AUC scores of the instant classification engine with the AUC scores associated with results obtained using a CRF-LS™ model, proposed by (Di Jin and Peter Szolovits. 2018. "Pico element detection in medical text via long short-term memory neural networks." In *Proceedings of the BioNLP* 2018 workshop, pages 67-75) incorporated herein by reference in its entirety, trained on hand-labeled Piconet abstracts. The test set used was the hand-labelled full medical articles dataset.

TABLE 2

| PIO | Instant Classification Engine | (Mezaoui, H. et al. 2019) | (Jin and Szolovits, 2018) |
| --- | --- | --- | --- |
| P | 0.9220 | 0.8834 | 0.8313 |
| I | 0.9203 | 0.8185 | 0.6810 |
| O | 0.9401 | 0.9230 | 0.9207 |

As shown in Table 2, using as the training dataset soft labelled full text articles produces higher PIO AUC scores than comparator classification systems trained on hand-labelled medical abstracts. The soft labelling was performed using the labelling functions, and the generative models using those labelling functions, described herein.

The labelling functions and the generative models described herein allow for implementation of weak supervision to generate soft labels from full medical articles. For example, a generative model (Snorkel) may be used, and trained on hand-labelled abstracts, to improve the majority vote of the labelling functions. Moreover, as shown in FIG. 10 there is a correlation between the modeling advantage and the accuracy of the classification engine when tested on full text. Furthermore, as shown in Table 2, in some examples training the classification engine on generated soft labels from full text may lead to better results compared to training on hand-labeled abstracts.

In some examples, the functions and features associated with the labelling functions, the generative models, and the corresponding training datasets and methods described herein may form part of methods 100, 300, and the other methods described herein. Moreover, in some examples, the functions and features associated with the labelling functions, the generative models, and the corresponding training datasets and methods described herein may be performed by or form part of systems 400, 500, 600, 700 and the other systems described herein.

Throughout this specification and the appended claims, infinitive verb forms are often used. Examples include, without limitation: "to generate," "to perform," "to store," "to output," and the like. Unless the specific context requires otherwise, such infinitive verb forms are used in an open, inclusive sense, that is as "to, at least, generate," to, at least, perform," "to, at least, store," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for multi-label classification of a sentence, the method comprising:
receiving the sentence from a machine-readable memory;
generating a first digital representation corresponding to words of the sentence;
generating a second digital representation corresponding to the words of the sentence;
performing a first classification of the sentence using a classification engine receiving as input the first digital representation, the first classification to generate a first set of probabilities each associated with one of possible labels for the sentence;
performing a second classification of the sentence using the classification engine receiving as input the second digital representation, the second classification to generate a second set of probabilities each associated with one of the possible labels for the sentence;
generating a text feature score based on the sentence, the text feature score corresponding to a text feature of the sentence;
generating an output probability for each given label of the possible labels, the output probability generated based on the text feature score, a first probability associated with the given label, and a second probability associated with the given label, the first probability and the second probability from the first set of probabilities and the second set of probabilities respectively; and
outputting the output probability for each of the possible labels.

2. The method of claim 1, wherein the classification engine comprises a neural network.

3. The method of claim 2, wherein the neural network comprises an input layer, a first hidden layer, a second hidden layer, a third hidden layer, a fourth hidden layer, and an output layer.

4. The method of claim 3, wherein the neural network further comprises a self attention layer between the input layer and the first hidden layer.

5. The method of claim 3, wherein the neural network further comprises at least one of:
a first dropout applied to the first hidden layer;
a second dropout applied to the second hidden layer;
a third dropout applied to the third hidden layer; and
a fourth dropout applied to the fourth hidden layer.

6. The method of claim 3, wherein the output layer comprises a number of neurons corresponding to a number of the possible labels for the sentence.

7. The method of claim 3, wherein the neural network comprises a loss function comprising binary cross entropy with logits.

8. The method of claim 1, further comprising:
generating a further text feature score based on the sentence; and
wherein:
the generating the output probability comprises generating the output probability based on the text feature score, the further text feature score, the first probability, and the second probability.

9. The method of claim 8, wherein:
the generating the text feature score comprises calculating a ratio of a number of quantitative features of the sentence to a corrected number of the words of the sentence; and
the generating the further text feature score comprises calculating an average text frequency inverse document frequency (TF-IDF) score for the sentence.

10. The method of claim 9, wherein the calculating the average TF-IDF score comprises:
calculating a TF-IDF score for each word of the sentence;
summing the TF-IDF scores to obtain an aggregate TF-IDF score; and
dividing the aggregate TF-IDF score by a number of the words in the sentence.

11. The method of claim 1, wherein the generating the output probability comprises generating the output probability using a decision tree taking as attributes the text feature score, the first probability, and the second probability, the decision tree comprising a light gradient boosting machine (LGBM).

12. The method of claim 1, further comprising:
training the classification engine using a training dataset before one or more of the performing the first classification and the performing the second classification;
wherein:
the training comprises soft labelling a plurality of full-text documents using a generative model to generate the training dataset.

13. The method of claim 12, wherein the soft labelling comprises using at least one labelling function to label at least a given portion of each of the full-text documents, for each of the full-text documents the labelling function to:

generate one of a set of possible outputs comprising positive, abstain, and negative in relation to associating the given portion with a given label; and generate the one of the set of possible outputs using a frequency-based approach comprising assessing the given portion in relation to at least another portion of the full-text document.

14. The method of claim 13, wherein the soft labelling comprises generating using the generative model soft labels based on a weighted majority vote of a plurality of labelling functions, the plurality of the labelling functions comprising the at least one labelling function and one or more additional labelling functions.

15. The method of claim 14, wherein a density of the labelling functions is in a middle-density regime.

16. A system for multi-label classification of a sentence, the system comprising:

a memory to store the sentence having words;

a processor in communication with the memory, the processor to:

receive the sentence from the memory;

generate a first digital representation corresponding to the words of the sentence;

generate a second digital representation corresponding to the words and the of the sentence;

perform a first classification of the sentence using a classification engine receiving as input the first digital representation, the first classification to generate a first set of probabilities each associated with one of possible labels for the sentence;

perform a second classification of the sentence using the classification engine receiving as input the second digital representation, the second classification to generate a second set of probabilities each associated with one of the possible labels for the sentence;

generate a text feature score based on the sentence, the text feature score corresponding to a text feature of the sentence;

generate an output probability for each given label of the possible labels, the output probability generated based on the text feature score, a first probability associated with the given label, and a second probability associated with the given label, the first probability and the second probability from the first set of probabilities and the second set of probabilities respectively; and output the output probability for each of the possible labels.

17. The system of claim 16, wherein the classification engine comprises a neural network.

18. The system of claim 17, wherein the neural network comprises an input layer, a first hidden layer, a second hidden layer, a third hidden layer, a fourth hidden layer, and an output layer.

19. The system of claim 18, wherein the neural network further comprises a self attention layer between the input layer and the first hidden layer.

20. The system of claim 18, wherein the neural network further comprises at least one of:

a first dropout applied to the first hidden layer;

a second dropout applied to the second hidden layer;

a third dropout applied to the third hidden layer; and a fourth dropout applied to the fourth hidden layer.

21. The system of claim 18, wherein the output layer comprises a number of neurons corresponding to a number of the possible labels for the sentence.

22. The system of claim 18, wherein the neural network comprises a loss function comprising binary cross entropy with logits.

23. The system of claim 16, wherein the processor is further to:

generate a further text feature score based on the sentence; and wherein:

to generate the output probability the processor is to generate the output probability based on the text feature score, the further text feature score, the first probability, and the second probability.

24. The system of claim 23, wherein:

to generate the text feature score the processor is to calculate a ratio of a number of quantitative features of the sentence to a corrected number of the words of the sentence; and to generate the further text feature score the processor is to calculate an average text frequency inverse document frequency (TF-IDF) score for the sentence.

25. The system of claim 24, wherein to calculate the average TF-IDF score the processor is to:

calculate a TF-IDF score for each word of the sentence;

sum the TF-IDF scores to obtain an aggregate TF-IDF score; and divide the aggregate TF-IDF score by a number of the words in the sentence.

26. The system of claim 16, wherein to generate the output probability the processor is to generate the output probability using a decision tree taking as attributes the text feature score, the first probability, and the second probability, the decision tree comprising a light gradient boosting machine (LGBM).

27. The system of claim 16, wherein the processor is further to:

train the classification engine using a training dataset before one or more of performing the first classification and performing the second classification;

wherein:

to train the classification engine the processor is to soft label a plurality of full-text documents using a generative model to generate the training dataset.

28. The system of claim 27, wherein to soft label the plurality of the full-text documents the processor is to use at least one labelling function to label at least a given portion of each of the full-text documents, for each of the full-text documents the labelling function to:

generate one of a set of possible outputs comprising positive, abstain, and negative in relation to associating the given portion with a given label; and generate the one of the set of possible outputs using a frequency-based approach comprising assessing the given portion in relation to at least another portion of the full-text document.

29. The system of claim 28, wherein to soft label the plurality of the full-text documents the processor is to generate using the generative model soft labels based on a weighted majority vote of a plurality of labelling functions, the plurality of the labelling functions comprising the at least one labelling function and one or more additional labelling functions.

30. The system of claim 29, wherein a density of the labelling functions is in a middle-density regime.

31. A non-transitory computer-readable storage medium (CRSM) comprising instructions for multi-label classification of a sentence, the instructions executable by a processor, the instructions to cause the processor to:

receive the sentence from a memory in communication with the processor;
generate a first digital representation corresponding to words of the sentence;
generate a second digital representation corresponding to the words and the of the sentence;
perform a first classification of the sentence using a classification engine receiving as input the first digital representation, the first classification to generate a first set of probabilities each associated with one of possible labels for the sentence;
perform a second classification of the sentence using the classification engine receiving as input the second digital representation, the second classification to generate a second set of probabilities each associated with one of the possible labels for the sentence;
generate a text feature score based on the sentence, the text feature score corresponding to a text feature of the sentence;
generate an output probability for each given label of the possible labels, the output probability generated based on the text feature score, a first probability associated with the given label, and a second probability associated with the given label, the first probability and the second probability from the first set of probabilities and the second set of probabilities respectively; and
output the output probability for each of the possible labels.

32. The CRSM of claim 31, wherein the classification engine comprises a neural network.

33. The CRSM of claim 32, wherein the neural network comprises an input layer, a first hidden layer, a second hidden layer, a third hidden layer, a fourth hidden layer, and an output layer.

34. The CRSM of claim 33, wherein the neural network further comprises a self attention layer between the input layer and the first hidden layer.

35. The CRSM of claim 33, wherein the neural network further comprises at least one of:
a first dropout applied to the first hidden layer;
a second dropout applied to the second hidden layer;
a third dropout applied to the third hidden layer; and
a fourth dropout applied to the fourth hidden layer.

36. The CRSM of claim 33, wherein the output layer comprises a number of neurons corresponding to a number of the possible labels for the sentence.

37. The CRSM of claim 33, wherein the neural network comprises a loss function comprising binary cross entropy with logits.

38. The CRSM of claim 31, wherein the instructions are to further cause the processor to:
generate a further text feature score based on the sentence; and
wherein:
to generate the output probability the instructions are to cause the processor to generate the output probability based on the text feature score, the further text feature score, the first probability, and the second probability.

39. The CRSM of claim 38, wherein:
to generate the text feature score the instructions are to cause the processor to calculate a ratio of a number of quantitative features of the sentence to a corrected number of the words of the sentence; and
to generate the further text feature score the instructions are to cause the processor to calculate an average text frequency inverse document frequency (TF-IDF) score for the sentence.

40. The CRSM of claim 39, wherein to calculate the average TF-IDF score the instructions are to cause the processor to:
calculate a TF-IDF score for each word of the sentence;
sum the TF-IDF scores to obtain an aggregate TF-IDF score; and
divide the aggregate TF-IDF score by a number of the words in the sentence.

41. The CRSM of claim 31, wherein to generate the output probability the instructions are to cause the processor to generate the output probability using a decision tree taking as attributes the text feature score, the first probability, and the second probability, the decision tree comprising a light gradient boosting machine (LGBM).

42. The CRSM of claim 31, wherein the instructions are to further cause the processor to:
train the classification engine using a training dataset before one or more of performing the first classification and performing the second classification;
wherein:
to train the classification engine the instructions are to cause the processor to soft label a plurality of full-text documents using a generative model to generate the training dataset.

43. The CRSM of claim 42, wherein to soft label the plurality of the full-text documents the instructions are to cause the processor to use at least one labelling function to label at least a given portion of each of the full-text documents, for each of the full-text documents the labelling function to:
generate one of a set of possible outputs comprising positive, abstain, and negative in relation to associating the given portion with a given label; and
generate the one of the set of possible outputs using a frequency-based approach comprising assessing the given portion in relation to at least another portion of the full-text document.

44. The CRSM of claim 43, wherein to soft label the plurality of the full-text documents the instructions are to cause the processor to generate using the generative model soft labels based on a weighted majority vote of a plurality of labelling functions, the plurality of the labelling functions comprising the at least one labelling function and one or more additional labelling functions.

45. The CRSM of claim 44, wherein a density of the labelling functions is in a middle-density regime.

* * * * *